US012577974B2

(12) United States Patent
Peng et al.

(10) Patent No.: US 12,577,974 B2
(45) Date of Patent: Mar. 17, 2026

(54) LOCKING DEVICE

(71) Applicant: Southco Manufacturing and Technology (Shenzhen) Co., Ltd., Shenzhen (CN)

(72) Inventors: Jingyao Peng, Shenzhen (CN); Jack Hu, Shenzhen (CN)

(73) Assignee: Southco Manufacturing and Technology (Shenzhen) Co., Ltd., Shenzhen (CN)

( * ) Notice: Subject to any disclaimer, the term of this patent is extended or adjusted under 35 U.S.C. 154(b) by 432 days.

(21) Appl. No.: 18/105,492

(22) Filed: Feb. 3, 2023

(65) Prior Publication Data

US 2024/0011518 A1 Jan. 11, 2024

(30) Foreign Application Priority Data

Jul. 8, 2022 (CN) .......................... 202210804775.9

(51) Int. Cl.
F16B 21/02 (2006.01)
F16B 5/06 (2006.01)
F16B 21/09 (2006.01)

(52) U.S. Cl.
CPC ............ F16B 21/02 (2013.01); F16B 5/0642 (2013.01); F16B 21/09 (2013.01); F16B 2005/0671 (2013.01)

(58) Field of Classification Search
CPC .... F16B 5/0266; F16B 5/0621; F16B 5/0642; F16B 5/0664; F16B 2005/0671;

(Continued)

(56) References Cited

U.S. PATENT DOCUMENTS 7,118,138 B1 * 10/2006 Rowley ................. F16L 37/244
                                                   403/348
8,517,653 B2 * 8/2013 Ramsauer ............. F16B 19/109
                                                   411/347

(Continued)

FOREIGN PATENT DOCUMENTS

CN          201896831 U  * 7/2011
CN          102384134 A  * 3/2012 ................ F16B 5/00

(Continued)

OTHER PUBLICATIONS

Translation of CN-103148067A. Wang, Ding-rui. Quick Fastening Device for Torsional Fastening. Jun. 12, 2013.*

(Continued)

*Primary Examiner* — Amber R Anderson
*Assistant Examiner* — Kevin J Baynes
(74) *Attorney, Agent, or Firm* — Buchanan Ingersoll & Rooney PC

(57) ABSTRACT

The present application discloses a locking device including: a mounting seat; a locking member, rotatable around an axial direction and movable in the axial direction, when the locking member is in a first axial position and a first rotational position, the locking member is retracted into the mounting seat along the axial direction, and the mounting seat prevents the locking member from rotating around the axial direction; and when the locking member is in a second axial position and a second rotational position, at least a portion of the locking member extends in the axial direction from the mounting seat, to be inserted into and engaged with a second object, and the mounting seat prevents the locking member from moving in the axial direction; and a compression torsional spring biasing the locking member toward the first axial position and the second rotational position.

9 Claims, 25 Drawing Sheets

(58) Field of Classification Search
CPC .......... F16B 21/02; F16B 21/04; F16B 21/06; F16B 21/09; F16B 2200/95; F16B 2200/99; Y10T 403/598; Y10T 403/599; Y10T 403/7005; Y10T 403/7018; Y10T 403/7021
See application file for complete search history.

(56) References Cited

U.S. PATENT DOCUMENTS

| | | | | |
|---|---|---|---|---|
| 8,622,673 | B2 * | 1/2014 | Wong | F16B 5/0266 |
| | | | | 411/347 |
| 8,657,545 | B2 * | 2/2014 | Magno, Jr. | F16B 7/187 |
| | | | | 248/316.1 |
| 8,939,691 | B2 * | 1/2015 | Tseng | F16B 21/04 |
| | | | | 411/347 |
| 9,850,928 | B2 * | 12/2017 | Bowers | F16B 5/0642 |
| 10,132,345 | B2 * | 11/2018 | Wu | F16B 21/02 |
| 10,215,208 | B2 * | 2/2019 | Bowers | E05B 1/003 |
| 10,294,971 | B2 * | 5/2019 | Wu | F16B 5/0635 |
| 10,302,108 | B2 * | 5/2019 | Wu | F16B 5/0642 |
| 10,344,786 | B2 * | 7/2019 | Jodeleit | F16B 21/04 |
| 11,098,839 | B2 * | 8/2021 | Wang | F16B 37/042 |
| 12,159,177 | B2 * | 12/2024 | McCoy | G02B 5/124 |
| 12,173,746 | B2 * | 12/2024 | Wu | F16B 5/0266 |
| 2008/0246202 | A1 * | 10/2008 | Wang | F16B 5/0208 |
| | | | | 267/178 |
| 2011/0070049 | A1 * | 3/2011 | Wang | F16B 5/0208 |
| | | | | 411/372.6 |
| 2012/0224935 | A1 * | 9/2012 | Chiu | F16B 5/0208 |
| | | | | 411/352 |
| 2013/0183086 | A1 * | 7/2013 | Wang | F16B 5/0642 |
| | | | | 403/327 |
| 2015/0300547 | A1 | 10/2015 | Canzi et al. | |
| 2021/0003153 | A1 * | 1/2021 | Wang | F16B 5/0208 |
| 2023/0110234 | A1 * | 4/2023 | Wu | F16B 21/02 |
| | | | | 403/322.2 |

FOREIGN PATENT DOCUMENTS

| | | | | | |
|---|---|---|---|---|---|
| CN | 102536983 | A | * | 7/2012 | F16B 19/02 |
| CN | 202348860 | U | | 7/2012 | |
| CN | 103148067 | A | * | 6/2013 | F16B 5/00 |
| CN | 203397987 | U | | 1/2014 | |
| CN | 207998714 | U | | 10/2018 | |
| CN | 109366156 | A | | 2/2019 | |
| CN | 106438607 | B | * | 5/2019 | F16B 5/00 |
| EP | 0503760 | A1 | * | 9/1992 | |

OTHER PUBLICATIONS

Taiwanese Office Action for Taiwanese Application No. 112104115, dated Jul. 10, 2023 with translation, 16 pages.

\* cited by examiner

100

100

100

100

100

100

100

100

100

100

110

140

130

120

101

120

121

123

122

140

141

143

142

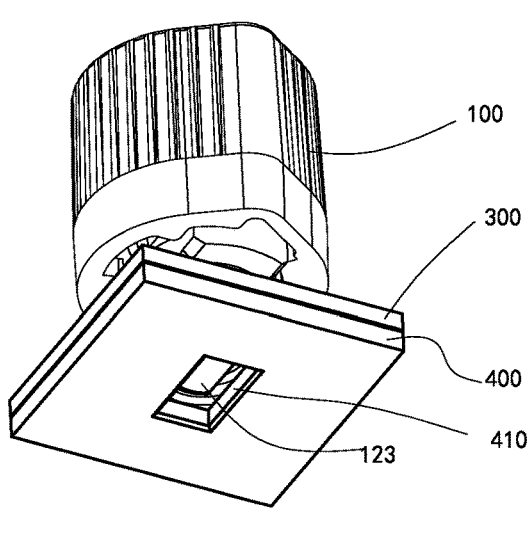
FIG. 7A
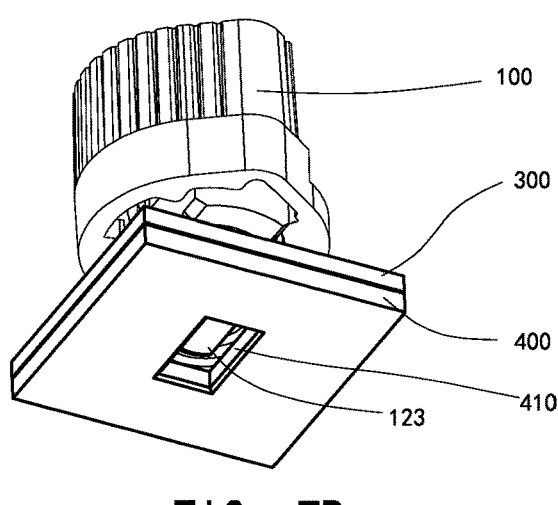
FIG. 7B
FIG. 7C

200

200

200

200

200

200

200

200

200

200

200

200

200

200

210

250

201

140

230

220

230

232

235

230

220

223

250

240

LOCKING DEVICE

CROSS REFERENCE TO RELATED APPLICATION

This application claims priority to Chinese Patent Application No. 202210804775.9, entitled "LOCKING DEVICE", filed on Jul. 8, 2022, the entire content of which is incorporated herein by reference.

TECHNICAL FIELD

The present application relates to a locking device, particularly a quick-locking type locking device.

BACKGROUND

A locking device is a common device used to fixed a first object to a second object or unlock the first object from the second object.

One kind of the locking device is a snap-type locking device, which can complete a locking action by simply pressing or twisting, instead of requiring multiple twists to complete the locking action as in the bolt-type locking device.

In the snap-type locking device according to the prior art, the locking device is mounted on the first object, and the user needs to press the locking device to insert at least a portion of the locking device into the second object, and then turn the locking device for fixing the first object to the second object by the locking device. When unlocking the locking device, the user needs to operate in a reverse order, that is, firstly twist the locking device in reverse, and then withdraw the locking device from the second object. It can be seen, the above locking and unlocking operations generally require two steps.

With massive use of the locking devices, how to further simplify operations of the locking devices in order to achieve fast locking and unlocking has become a new challenge. In some existing locking devices, attempts have been made to simplify operations of the locking device by providing compression springs and/or torsional springs to prompt automatic rotation and/or automatic movement of the locking device. However, even if a spring is provided, there is still room for continuous improvement in how to provide a proper elastic force of the spring, ensure a correct rotational positioning of the locking device, and simplify structure of the locking device.

SUMMARY

A locking device according to the application is provided, wherein the locking device comprises: a mounting seat, fixed to a first object; a locking member, rotatable around an axial direction and movable in the axial direction, and arranged on the mounting seat, when the locking member is in a first axial position and a first rotational position in respect to the mounting seat, the locking member is retracted into the mounting seat along the axial direction, and the mounting seat prevents the locking member from rotating around the axial direction; and when the locking member is in a second axial position and a second rotational position in respect to the mounting seat, at least a portion of the locking member extends in the axial direction from the mounting seat, to be inserted into and engaged with a second object, and the mounting seat prevents the locking member from moving in the axial direction; and a compression torsional spring, disposed between the mounting seat and the locking member, bias the locking member toward the first axial position and the second rotational position.

In an embodiment, the mounting seat includes: a base portion, fixed to the first object; a column portion, extending from an end face of the base portion along the axial direction perpendicular to the end face; a shaft hole, extending along the axial direction, located at a center of the column portion, and passing through the mounting seat; and at least one limiting protrusion, extending from an outer periphery of a middle section of the column portion along a transverse direction perpendicular to the axial direction, so as to form a rotation space among the column portion, the limiting protrusion, and the base portion.

In an embodiment, the locking member includes: a knob, sleeved on an outer side of the mounting seat, having a knob first end and a knob second end opposite to each other along the axial direction, and the knob second end is open toward the mounting seat; a locking bar, inserted in a shaft hole of the mounting seat, having a locking bar first end and a locking bar second end opposite to each other along the axial direction, the locking bar first end is fixed to the knob, and the locking bar second end is able to be retracted into or extended out the mounting seat from the knob second end along the axial direction.

In an embodiment, the locking bar further includes a bar head formed at the locking bar second end and extending transversally; a fixing hole shaped corresponding to the bar head is formed on the second object; and when the locking member is in the first rotational position, relative positions of the bar head and the fixing hole are corresponding to each other, so as to allow the locking member to pass through the fixing hole; and when the locking member is in the second rotational position, the relative positions of the bar head and the fixing hole are not corresponding to each other, so as to prevent the locking member from passing through the fixing hole, such that the bar head is able to be fixed to the second object.

In an embodiment, a reaming hole coaxial with the shaft hole is formed at the other end face of the base portion of the mounting seat; and a transverse maximum dimension of the bar head is smaller than an inner diameter of the reaming hole, but larger than an inner diameter of the shaft hole, and when the locking member is in the first axial position, the bar head is retracted into and accommodated in the reaming hole.

In an embodiment, an inner wall of the knob of the locking member is provided with at least one first clamping block protruding transversally inward and at least one second clamping block protruding transversally inward and spaced apart from the first clamping block in a circumferential direction; the first clamping block extends axially a first length from the knob second end toward the knob first end, and the second clamping block extends axially a second length less than the first length from the knob second end toward the knob first end; and positions and lengths of the first clamping block and the second clamping block in respect to the limiting protrusion are arranged: when the locking member is in the first axial position, both the first clamping block and the second clamping block are obstructed by the limiting protrusion in a circumferential direction around the axial direction, such that the locking member is unable to rotate, and when the locking member is in the second axial position, the first clamping block is obstructed by the limiting protrusion in one rotational direction along the circumferential direction, causing the locking member to be able to rotate in the other rotational direction along the circumferential direction, such that the second clamping block is located in the rotation space and obstructed by the limiting protrusion in the axial direction.

In an embodiment, the limiting protrusion is provided by two, and the two limiting protrusions are arranged on both sides of the column portion transversally opposite to each other; and each of the limiting protrusions has two transversally opposite side faces, and the side faces of the two limiting protrusions on a same side are connected to each other, such that a limiting space is formed between the side faces of the two limiting protrusions on the same side and an inner surface of the knob, resulting in the limiting space and the rotation space are alternately arranged in the circumferential direction.

In an embodiment, the first clamping block and the second clamping block each is provided by two, the two first clamping blocks are arranged symmetrically in respect to the axial direction, and the two second clamping blocks are arranged symmetrically in respect to the axial direction and are respectively spaced apart from the two first clamping blocks by an angle in the circumferential direction; and when the locking member is in the first axial position, one of the two first clamping blocks and one of the two second clamping blocks are located in one limiting space; and when the locking member is in the second axial position, the one first clamping block is still located in the one limiting space and the one second clamping block is able to be rotated from the one limiting space to the rotation space.

In an embodiment, an axial cross-section of the first clamping block is approximately triangular, and an axial cross-section of the second clamping block is approximately trapezoidal and occupies a circumferentially larger area than the axial cross-section of the first clamping block.

In an embodiment, the compression torsional spring includes: a spring first end, engaged to the locking member; a spring second end, engaged to the mounting seat; and a coil spring portion, connected between the spring first end and the spring second end and sleeved on the mounting seat; wherein a side wall of the knob has a sidewall protrusion transversally protruding outward, and the spring first end is inserted into a spring first end fixing portion at an inner side of the sidewall protrusion; and a spring second end fixing portion is disposed on the limiting protrusion, and the spring second end is inserted into the spring second end fixing portion.

In an embodiment, the locking device further comprises: an indicator, including: an annular portion; at least one indicator portion, extends axially from a side of the annular portion; a recessed portion, formed on a peripheral edge of the annular portion and recessed radially; the indicator is rotatably sleeved on the column portion of the mounting seat, and the recessed portion is engaged to the first clamping block on an inner side of the knob, such that the indicator rotates synchronously with the knob in respect to the mounting seat; and when the locking member is in the first axial position, the indicator portion is close to or inserted into an observation window at a top of the knob, and when the locking member is in the second axial position, the indicator portion is away from the observation window.

In an embodiment, the indicator further includes: an opening, formed on the other peripheral edge of the annular portion and passing through the annular portion; and the compression torsional spring includes: a spring first end, engaged to the locking member; a spring second end, engaged to the mounting seat; a first coil spring portion, located between the indicator and the knob; a second coil spring portion, located between the indicator and the limiting protrusion of the mounting seat; and a transition portion, connected between the first coil spring portion and the second coil spring portion and passing through the opening.

In an embodiment, the locking bar further includes a bar head formed at the locking bar second end and has a cylindrical shape; a circular fixing hole corresponding to the bar head is formed on the second object; and when the locking member is in the second axial position, the bar head is inserted into the fixing hole to prevent a radial relative movement between the first object and the second object.

BRIEF DESCRIPTION OF THE DRAWINGS

Hereinafter, embodiments of the application will be described in further detail by referring to the accompanying drawings, in which:

FIGS. 7A to 7C are schematic views of the locking device of the first embodiment applied to a first object and a second object with a locking member in an unlocked position (i.e., a first axial position and a first rotational position), and a portion of the knob has been removed in FIGS. 7B and 7C to show its internal components;

5

Figure 16:
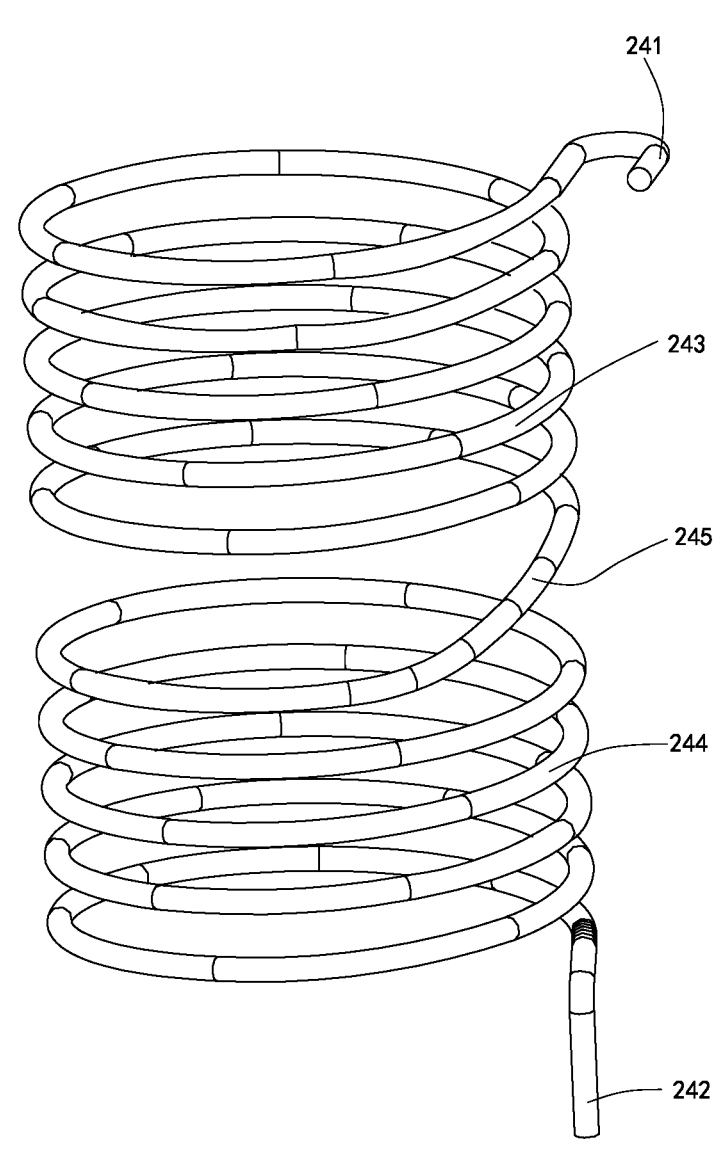
Figure 17A:
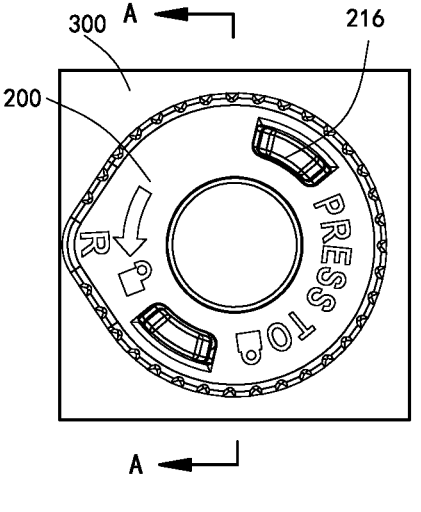
Figure 17B:
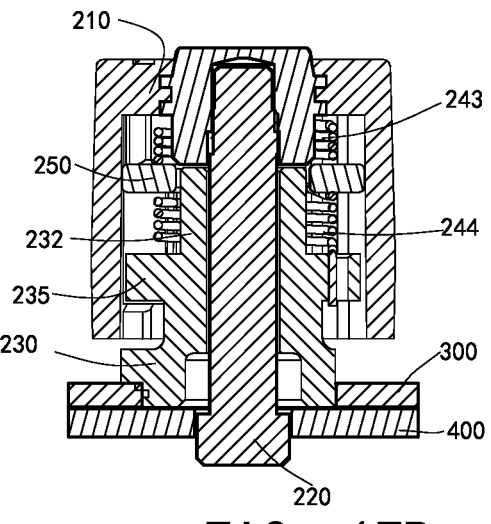
Figure 17C:
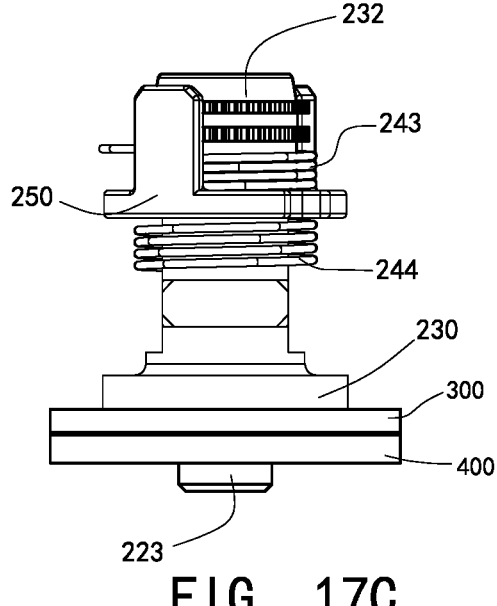
Figure 18A:
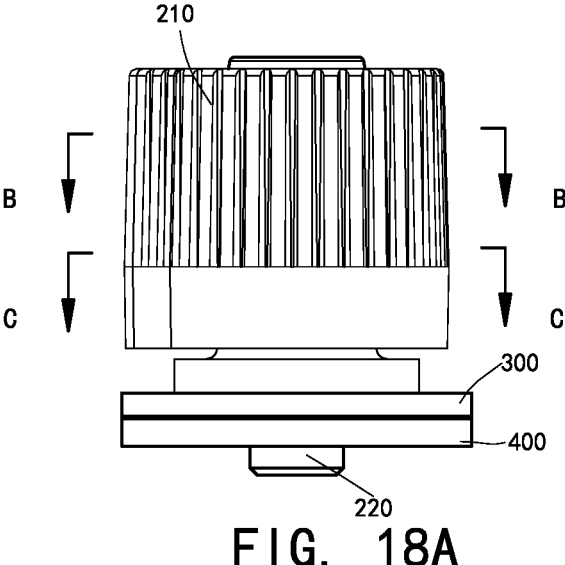
Figure 18B:
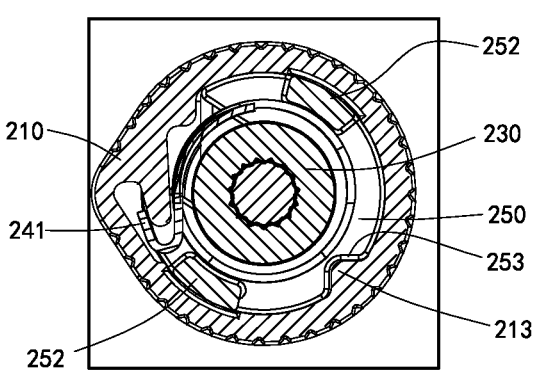
Figure 18C:
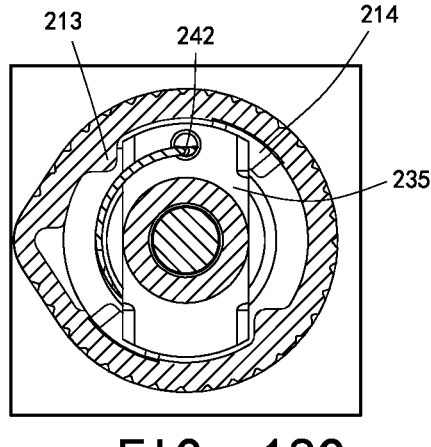
Figure 19A:
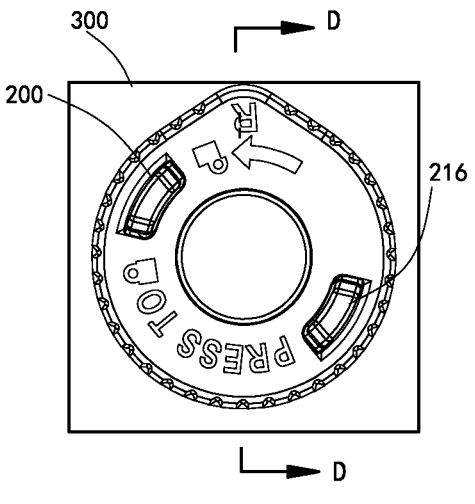
Figure 19B:
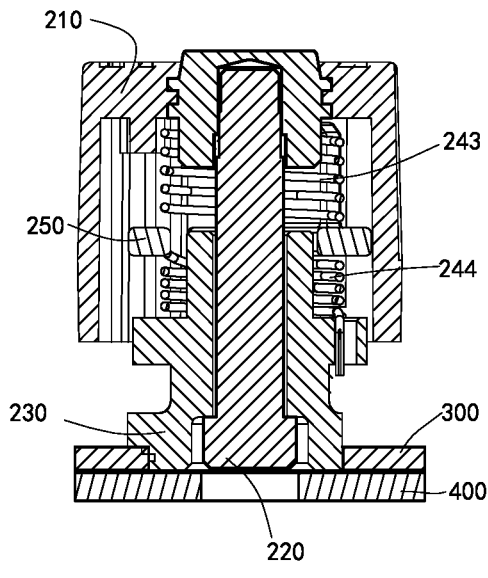
Figure 19C:
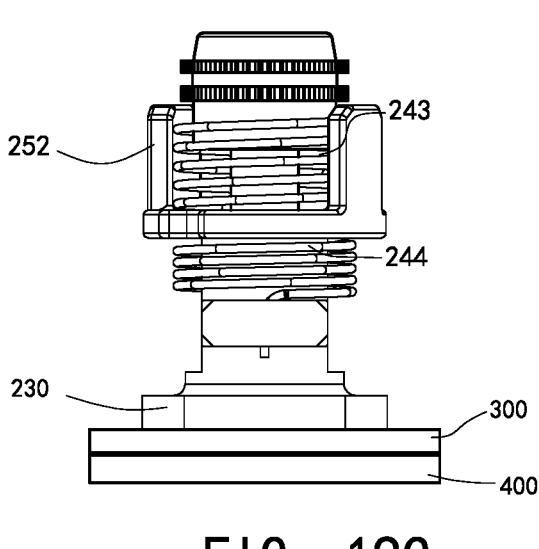
Figure 20A:
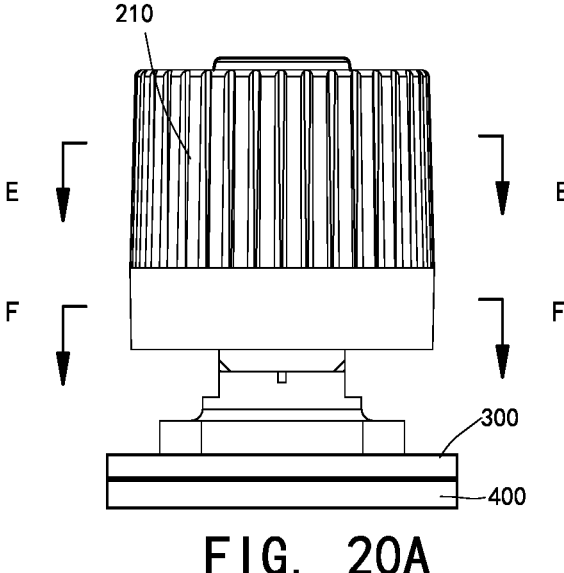
Figure 20B:
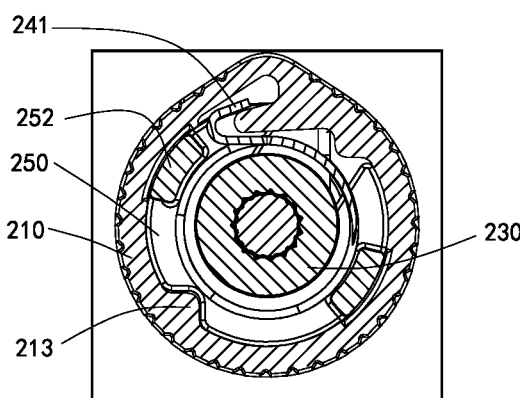
Figure 20C:
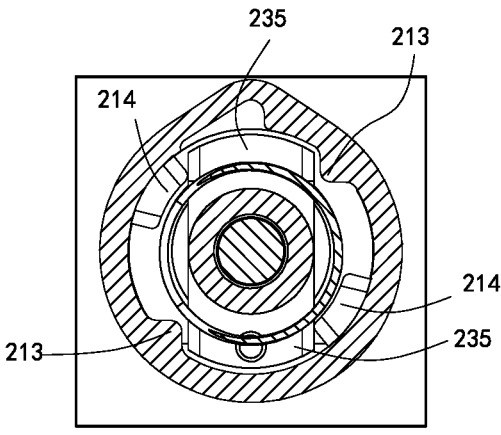
Figure 21A:
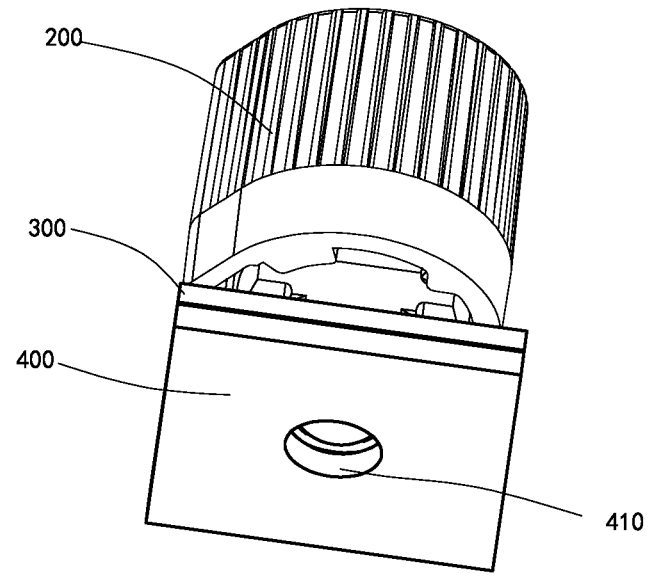
Figure 21B:
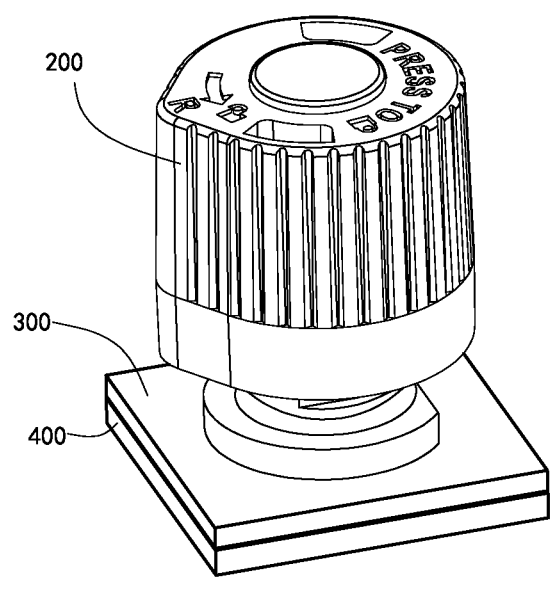
Figure 22A:
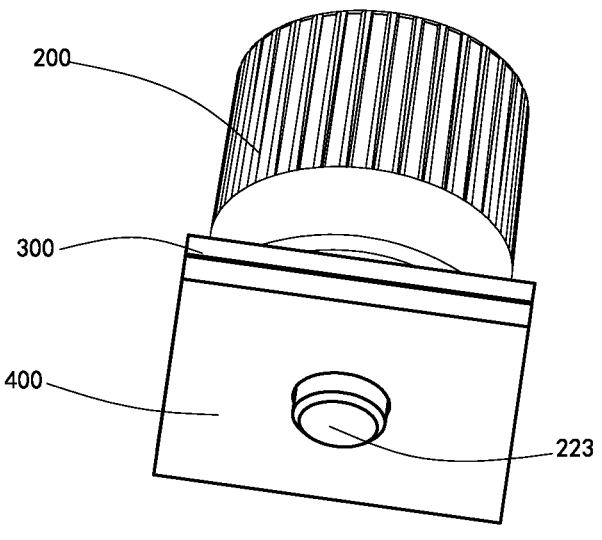
Figure 22B:
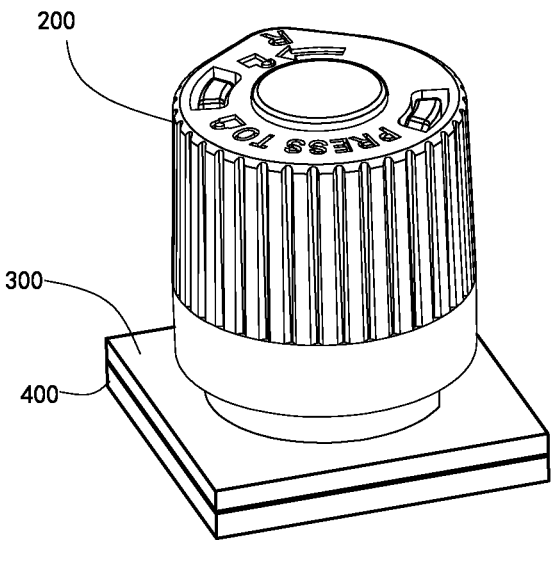

FIG. 16 is a perspective view of the compression torsional spring of the second embodiment;

FIG. 17A is a top view of the locking device in the locked position of the second embodiment with the first object and the second object also shown, FIG. 17B is a sectional view taken along line A-A in FIG. 17A, and FIG. 17C is a side view of the locking device with the knob removed;

FIG. 18A is a side view of the locking device in the locked position of the second embodiment, and FIGS. 18B and 18C are sectional views respectively taken along lines B-B and C-C in FIG. 18A;

FIG. 19A is a top view the locking device in the unlocked position of the second embodiment with the first object and the second object also shown, FIG. 19B is a sectional view taken along line D-D in FIG. 19A, and FIG. 19C is a side view of the locking device with the knob removed;

FIG. 20A is a side view of the locking device in the unlocked position of the second embodiment, and FIGS. 20B and 20C are sectional views respectively taken along lines E-E and F-F in FIG. 20A;

FIG. 21A and FIG. 21B are perspective views of the locking device in the unlocked position of the second embodiment applied to the first object and the second object;

FIG. 22A and FIG. 22B are perspective views of the locking device in the locked position of the second embodiment applied to the first object and the second object.

DETAILED DESCRIPTION

While the application is illustrated and described herein with reference to specific embodiments, the application should not be limited to the details shown. Rather, various modifications may be made in these details within the scope of equivalents of the claims and without departing from the application.

Directional expressions such as |front," "rear," "up" and "down" are only used for convenience of understanding in this document, and the application is not limited to these directions, but can be adjusted according to the actual situation.

Figure 1D:
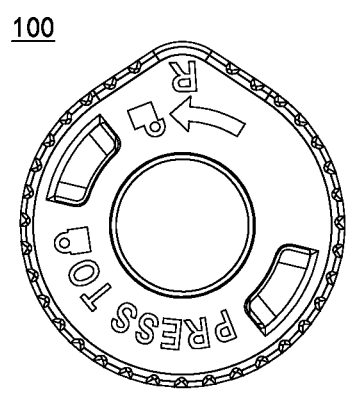
FIGS. 1A to 1E are respectively a front view, a left view, a right view, a top view, and a bottom view of a locking device according to a first embodiment of the application.
Figure 1A:
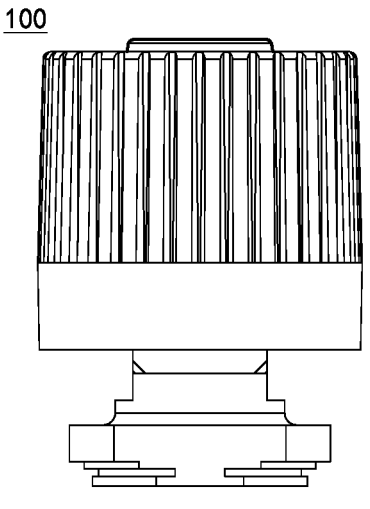
Figure 1B:
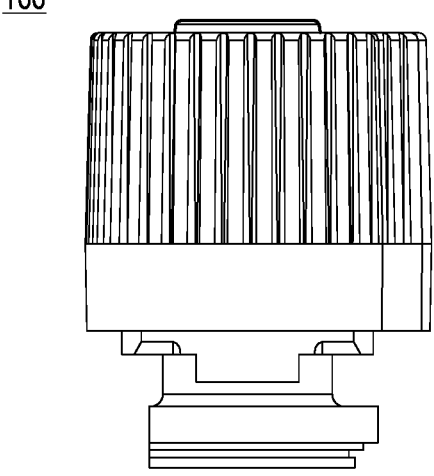
Figure 1E:
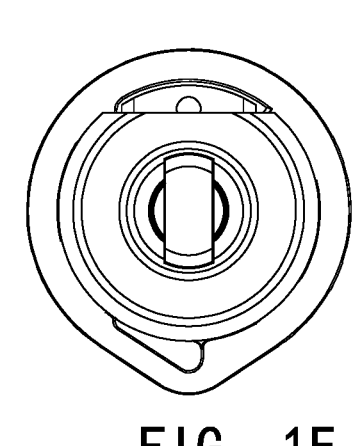
Figure 1C:
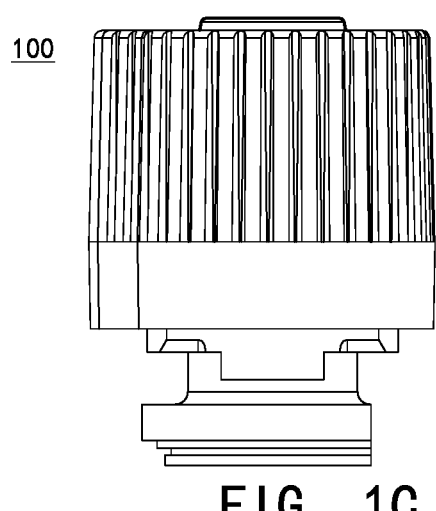
Figure 1F:
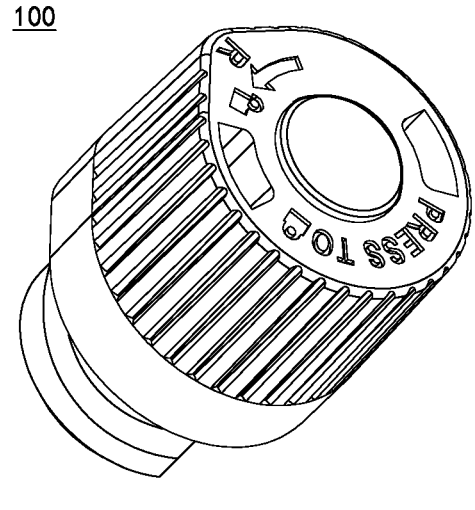
FIGS. 1F to 1I are perspective views of the locking device of the first embodiment from different angles.
Figure 1G:
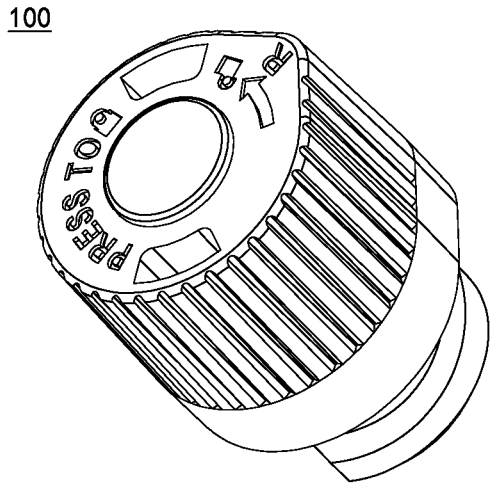
Figure 1H:
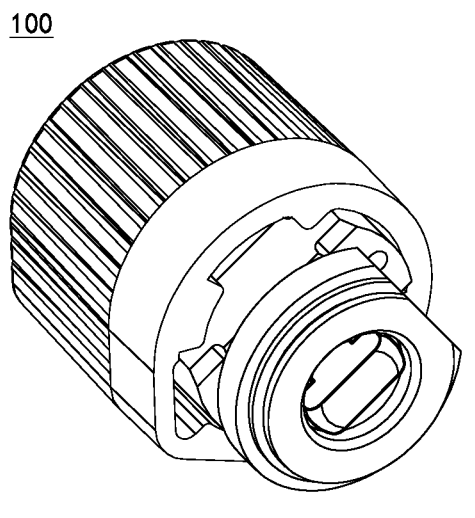
Figure 1I:
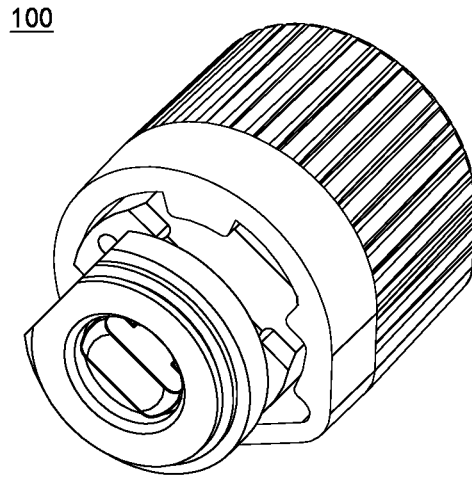
Figure 2:
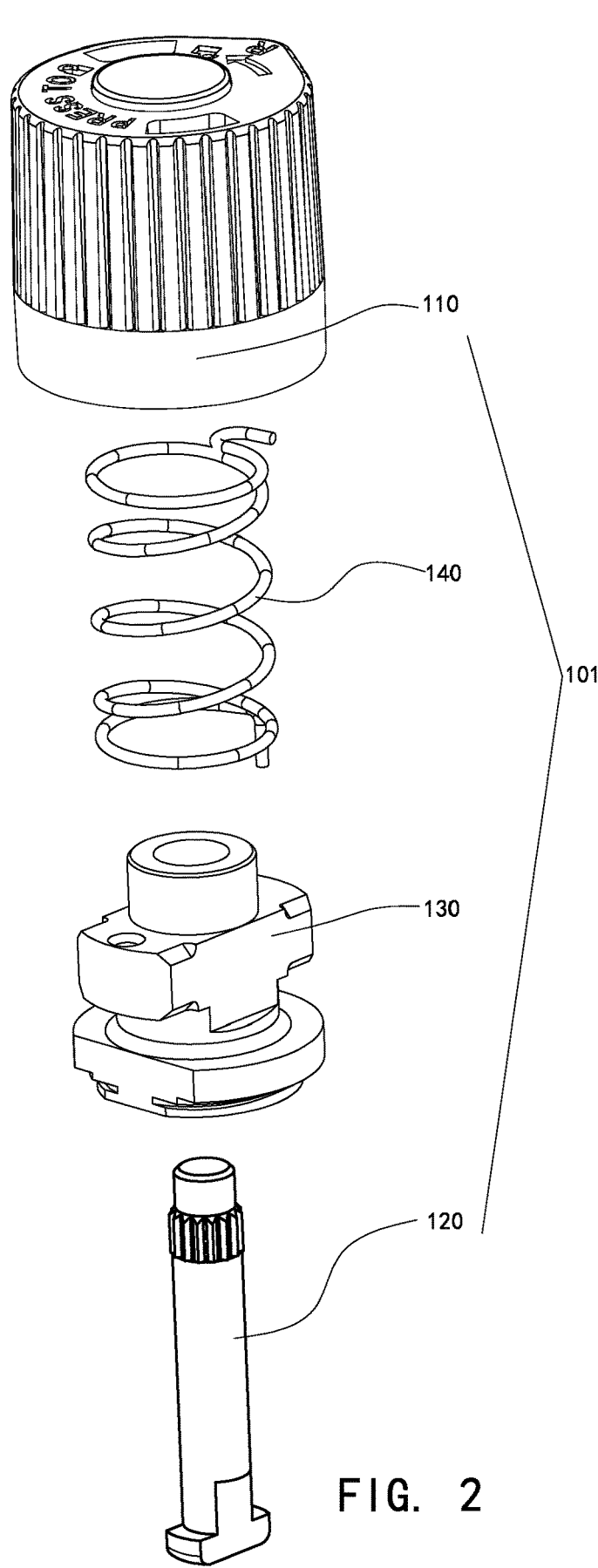
FIG. 2 is an exploded perspective view of the locking device of the first embodiment.

Firstly, a locking device 100 according to the application will be described in its entirety with reference to FIGS. 1A to 2. As shown, the locking device 100 includes a mounting seat 130, a locking member 101, and a compression torsional spring 140.

The mounting seat 130 is fixed to a first object 300. A bottom surface of the mounting seat 130 may have a non-circular profile, so as to be torsionally fixed to the first object 300.

The locking member 101 is releasably locked to a second object 400 (the first object 300 and the second object 400 are shown in FIGS. 7A to 8C), so as to lock the first object 300 to the second object 400 or release the first object 300 from the second object 400. The locking member 101 is arranged on the mounting seat 130 to be able to rotate around an axial direction and movable in the axial direction. When the locking member 101 is in a first axial position and a first rotational position in respect to the mounting seat 130 (the first axial position 和 the first rotational position are collectively referred to as an unlocked position), the locking member 101 is retracted into the mounting seat 130 along the axial direction, and the mounting seat 130 prevents the locking member 101 from rotating around the axial direction; and when the locking member 101 is in a second axial position and a second rotational position (the second axial position and the second rotational position are collectively referred to as a locked position) in respect to the mounting seat 130, at least a portion of the locking member 101 extends along the axial direction from the mounting seat 130, so as to be inserted into and engaged with the second object 400, and the mounting seat 130 prevents the locking member 101 from moving in the axial direction, which will be described in detail below.

The compression torsional spring 140 is disposed between the mounting seat 130 and the locking member 101, biasing the locking member 101 toward the first axial position and the second rotational position. That is, the compression torsional spring 140 biases the locking member 101 toward the unlocked position in the axial direction, and biases the locking member 101 toward the locked position in the rotational direction. The compression torsional spring 140 is used to assist movement of the locking member 101, so as to simplify operation of the user or to hold the locking member 101 in place.

The locking member 101 includes a knob 110 and a locking bar 120. The knob 110 and the locking bar 120 are fixedly assembled with each other to form the locking member 101.

Figure 3A:
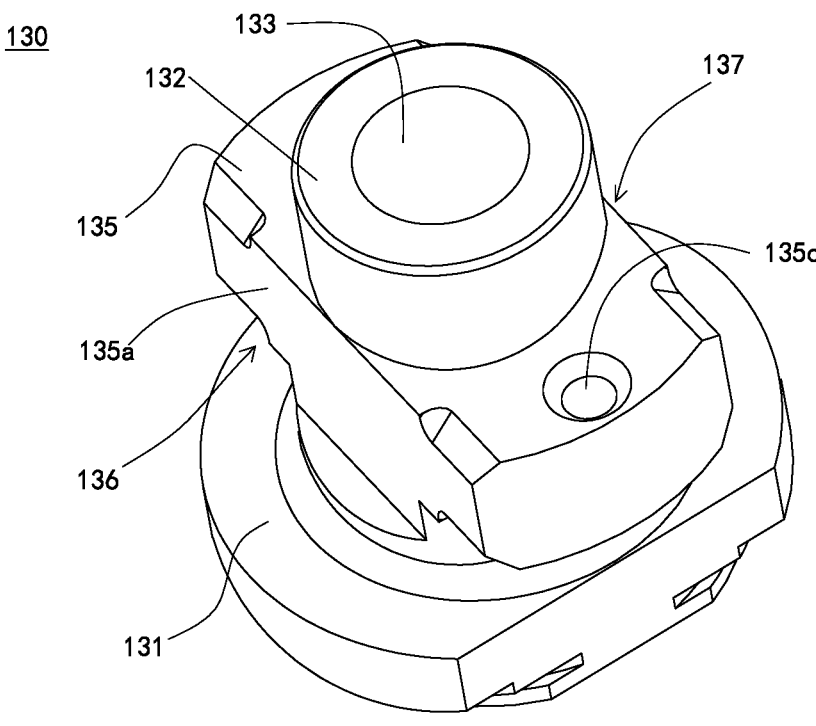
FIGS. 3A and 3B are perspective views of a mounting seat of the first embodiment from different angles.
Figure 3B:
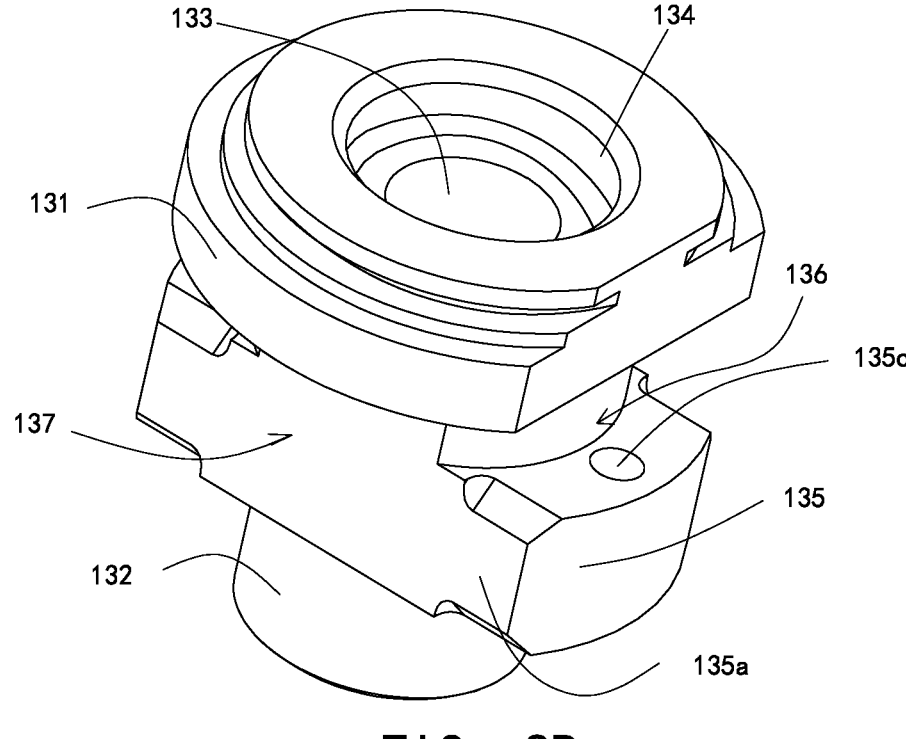

The specific structure of the mounting seat 130 will now be described with reference to FIGS. 3A to 3B.

The mounting seat 130 includes a base portion 131, a column portion 132, a shaft hole 133, a reaming hole 134, a limiting protrusion 135, a rotation space 136, and a limiting space 137.

The base portion 131 is located at a bottom of the mounting seat 130, and fixed to the first object 300. As previously mentioned, the base portion 131 may have a non-circular shape.

The column portion 132 extends from one end face (i.e., a top end face) of the base portion 131 in an axial direction perpendicular to the end face. In this embodiment, a cross section of the column portion 132 is cylindrical. However, this is not necessary, and the cross section of the column portion 132 may also be oval, square or hexagonal.

The shaft hole 133 extends along the axial direction, and is located in a center of the column portion 132 and penetrates through the mounting seat 130. Except at the reaming hole 134, the shaft hole 133 has a substantially constant inner diameter in the axial direction.

At least one limiting protrusion 135 extends from an outer periphery of a middle section of the column portion 132 in a transverse direction perpendicular to the axial direction. In this embodiment, two limiting protrusions 135 are arranged transversally opposite to each other on both sides of the column portion 132. However, it should be understood, only one limiting protrusion 135 may be arranged, or three, four or more limiting protrusions 135 may be arranged.

In this embodiment, each limiting protrusion 135 is located approximately in axial middle of the column portion 132. However, this is not necessary, and the limiting protrusion(s) 135 may also be located at a higher or lower position in the axial direction, as long as a gap can be left between the limiting protrusion 135 and the base portion 131. Moreover, each limiting protrusion 135 may be located at a different axial position.

In this embodiment, each limiting protrusion 135 has two side faces 135a opposite to each other in the transverse direction, and the side faces 135a of the two limiting protrusions 135 on the same side are connected to each other, such that a limiting space 137 is formed between the side faces 135a on the same side of the two limiting protrusions 135 and an inner surface of the knob 110, resulting in the limiting space 137 and the rotation space 136 are alternately arranged in the circumferential direction. A first clamping block 113 and/or a second clamping block 114 of the locking member 101 may move in the limiting space 137 to limit a rotational movement of the locking member 101, which will be described in detail below.

In other embodiments, the side faces 135a of the two limiting protrusions 135 on the same side are not necessary to be connected to each other, but may be respectively connected to the side faces 135a of the column portion 132. In this way, the limiting space 137 is formed between the side faces 135a of the two limiting protrusions 135 on the same side, the side faces 135a of the column portion 132, and the inner surface of the knob 110.

Because there is a gap between the limiting protrusion 135 and the base portion 131, the rotation space 136 is formed among the column portion 132, the limiting protrusion 135, and the base portion 131.

A spring second end fixing portion 135c is disposed on the limiting protrusion 135. The spring second end fixing portion 135c is, for example, a hole passing through the limiting protrusion 135 in the axial direction.

On the other end face of the mounting seat 130 (i.e., the end face opposite to the one where the column portion 132 is located, or the bottom end face), the reaming hole 134 (i.e., a hole diameter increased portion or bar head accommodating portion) which is coaxial with the shaft hole 133 is formed. The reaming hole 134 is used for accommodating a bar head 123 of the locking bar 120 of the locking member 101.

Figure 4A:
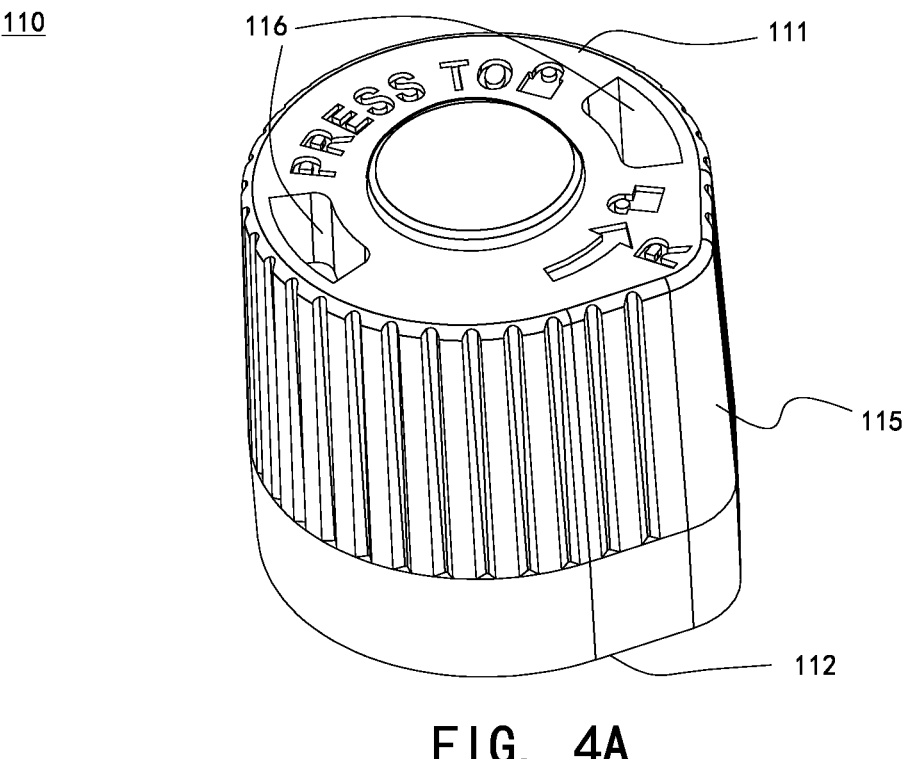
FIGS. 4A and 4B are perspective views of a knob of the first embodiment from different angles.
Figure 4B:
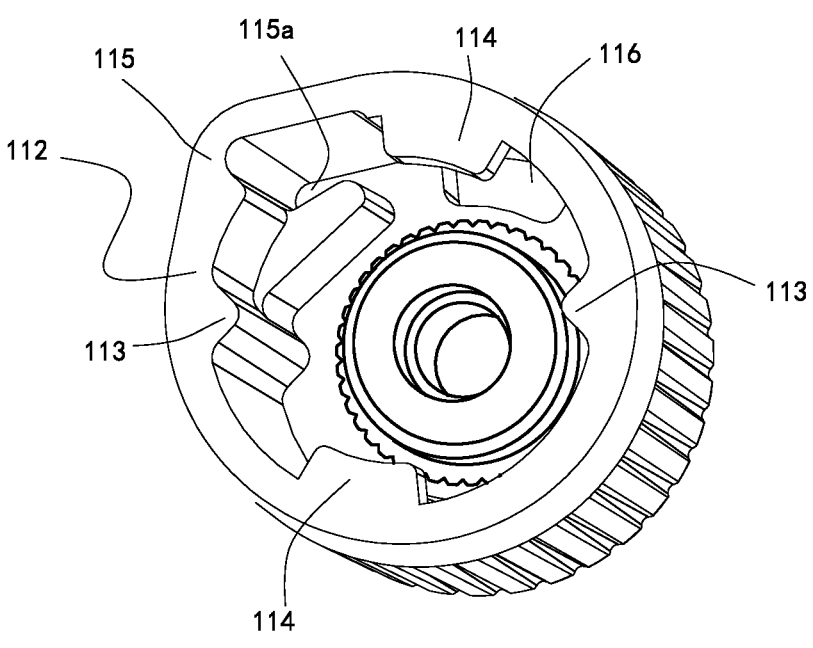

Now the knob 110 will be described with reference to FIGS. 4A to 4B. The knob 110 includes a knob first end 111, a knob second end 112, a first clamping block 113, a second clamping block 114, a sidewall protrusion 115, and an observation window 116.

The knob 110 is sleeved on an outside of the mounting seat 130, and has a knob first end 111 and a knob second end 112 axially opposite to each other. The knob second end 112 is open toward the mounting seat 130.

A inner wall of the knob 110 is provided with at least one first clamping block 113 protruding transversally inward and at least one second clamping block 114 protruding transversally inward and spaced apart from the first clamping block 113 in the circumferential direction. The first clamping block 113 extends axially a first length from the knob second end 112 toward the knob first end 111, and the second clamping block 114 extends axially a second length which is less than the first length from the knob second end 112 toward the knob first end 111.

Therefore, the first clamping block 113 is a long clamping block, and the second clamping block 114 is a short clamping block. The first clamping block 113 can always abut against the limiting protrusion 135 of the mounting seat 130 to limit an axial rotation of the locking member 101, while the second clamping block 114 abuts against the limiting protrusion 135 to limit the rotation of the locking member 101 only when the locking member 101 is in the first axial position, and is offset from the limiting protrusion 135 in the circumferential direction when the locking member 101 is in the second axial position.

The positions and lengths of the first clamping block 113 and the second clamping block 114 in respect to the limiting protrusion 135 are arranged as follows: when the locking member 101 is in the first axial position, both the first clamping block 113 and the second clamping block 114 are obstructed by the limiting protrusion 135 in the circumferential direction (i.e., the rotational direction) around the axial direction, such that the locking member 101 cannot rotate; and when the locking member 101 is in the second axial position, the first clamping block 113 is obstructed by the limiting protrusion 135 in one rotational direction along the circumferential direction, causing the locking member 101 to be able to rotate in the other rotational direction along the circumferential direction, such that the second clamping block 114 is located in the rotation space 136 and obstructed by the limiting protrusion 135 in the axial direction. It should be understood, when the locking member 101 is in the locked position, the bar head 123 abuts against a bottom of the second object 400. Therefore, the axial movement of the locking member 101 can also be prevented by the abutting relationship between the bar head 123 and the second object 400. In such case, when the second clamping block 114 is rotated into the rotation space 136, the second clamping block 114 does not need to be obstructed by the limiting protrusion 135 in the axial direction.

The number of the first clamping blocks 113 and the number of the second clamping blocks 114 are respectively corresponding to the number of the limiting protrusions 135. In an embodiment with two limiting protrusions 135, there will be two first clamping blocks 113 and two second clamping blocks 114.

More specifically, the two first clamping blocks 113 are arranged symmetrically in respect to the axial direction, and the two second clamping blocks 114 are arranged symmetrically in respect to the axial direction and respectively spaced apart from the two first clamping blocks 113 by a certain angle, e.g., about 60 degrees to about 120 degrees, in the circumferential direction. When the locking member 101 is in the first axial position, one of the first clamping block 113 and one of the second clamping block 114 are in one limiting space 137. When the locking member 101 is in the second axial position, the first clamping block 113 is still in the limiting space 137, and the second clamping block 114 can rotate from the limiting space 137 into the rotation space 136.

In this embodiment, the axial cross-section of the first clamping block 113 is approximately triangular, and the axial cross-section of the second clamping block 114 is approximately trapezoidal and occupies a larger area than the axial cross-section of the first clamping block 113 in the circumferential direction. However, this is not necessary, and the first clamping block 113 and the second clamping block 114 may also have other cross-sectional shapes, as long as they can be engaged with the limiting protrusion 135.

The side wall of the knob 110 has a transversally protruding sidewall protrusion 115. In this embodiment, the sidewall protrusion 115 has a generally triangular cross-section. However, this is not necessary, the sidewall protrusion 115 may also have a cross-section shaped square, trapezoidal, or the like. A spring first end fixing portion 115a is disposed at an upper end of the inner side of the sidewall protrusion 115, and the spring first end fixing portion 115a may be, for example, arranged in a form of a slot.

An observation window 116 may be disposed on the top end face of the knob 110, so as to facilitate the use to observe the state of the locking device 100. For example, the top surface of the limiting protrusion 135 may be painted by a color. When the locking member 101 is in the locked position, the observation window 116 is rotated to be corresponding to the limiting protrusion 135, and the user can observe the limiting protrusion 135 through the observation window 116, so it is easy to know whether the locking member 101 is in the locked position.

Figure 5:
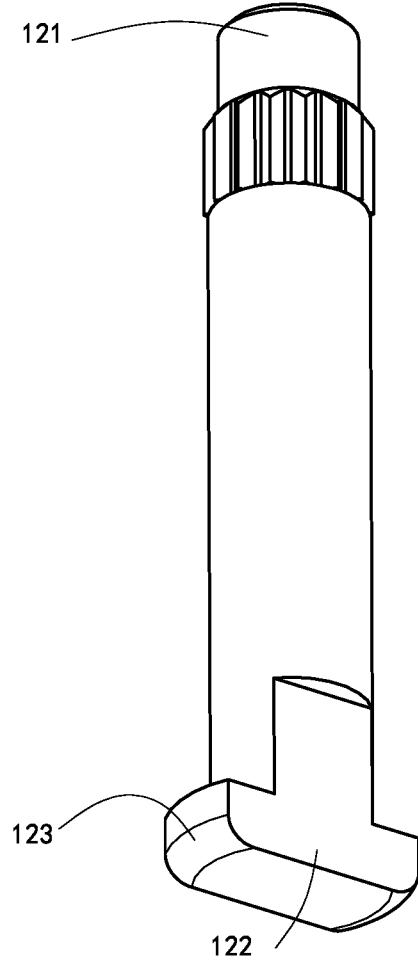
FIG. 5 is a perspective view of a locking bar of the first embodiment.

Now the specific structure of the locking bar 120 will be described with reference to FIG. 5. The locking bar 120 is inserted into the shaft hole 133 of the mounting seat 130, and the locking bar 120 includes a locking bar first end 121, a locking bar second end 122, and a bar head 123.

The locking bar first end 121 and the locking bar second end 122 are axially opposite to each other. The locking bar first end 121 is fixed to the knob 110, and the locking bar second end 122 can be retracted into or extended out the mounting seat 130 from the knob second end 112 along the axial direction.

The bar head 123 is formed at the locking bar second end 122 and extends transversally. A fixing hole 410 shaped corresponding to the bar head 123 is formed on the second object 400. When the locking member 101 is in the first rotational position, relative positions of the bar head 123 and the fixing hole 410 are corresponding to each other, so as to allow the locking member 101 to pass through the fixing hole 410. When the locking member 101 is in the second rotational position, the relative positions of the bar head 123 and the fixing hole 410 are not corresponding to each other, so as to prevent the locking member 101 from passing through the fixing hole 410, such that the bar head 123 can be fixed to the second object 400.

In this embodiment, the bar head 123 is formed in a transversally rectangular shape. In other embodiments, the bar head 123 may also be formed into a fan shape, a triangle shape, a trapezoid shape or other shapes. The top end of the bar head 123 may be provided with an inclined surface (not shown), such that the locking member 101 can be easily rotated to the second rotational position.

Figure 6:
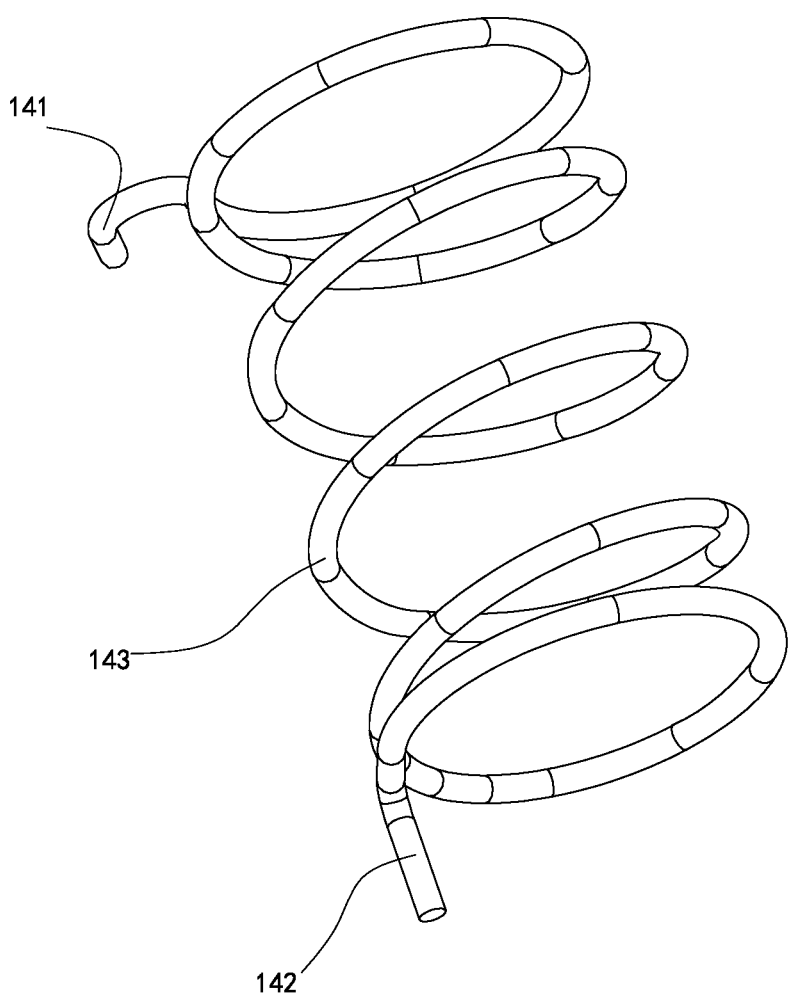
FIG. 6 is a perspective view of a compression torsional spring of the first embodiment.

The specific structure of the compression torsional spring 140 will be described with reference to FIG. 6. The compression torsional spring 140 includes a spring first end 141, a spring second end 142, and a coil spring portion 143.

The spring first end 141 is engaged to the locking member 101. The spring first end 141 may extend a distance transversally outwardly in respect to the coil spring portion 143, so as to be engaged into the spring first end fixing portion 115*a* of the knob 110 of the locking member 101.

The spring second end 142 is engaged to the mounting seat 130. The spring second end 142 may extend a distance axially downward in respect to the coil spring portion 143, so as to be engaged into the spring second end fixing portion 135*c* of the limiting protrusion 135 of the mounting seat 130.

The coil spring portion 143 is connected between the spring first end 141 and the spring second end 142, and is sleeved on the mounting seat 130.

It should be noted, the compression torsional spring 140 is arranged to bias the locking member 101 towards the first axial position and the second rotational position. The action of the locking device 100 will be described below in connection with its operation.

Now the operation of the locking device 100 will be described with reference to FIGS. 7A to 8C.

As shown in FIGS. 7A to 7C, the locking device 100 is in the unlocked position. At this time, the locking member 101 is in the first axial position and the first rotational position. The bar head 123 is retracted into the mounting seat 130, and the first clamping block 113 and the second clamping block 114 are both located in the limiting space 137. The first clamping block 113 and the second clamping block 114 located in the same limiting space 137 respectively abut against the limiting protrusions 135 on both sides, thus preventing the rotational movement of the locking member 101 but allowing the axial movement of the locking member 101. As described previously, the compression torsional spring 140 applies biasing the locking member 101 towards the first axial position and the second rotational position, i.e., simultaneously applies an axial biasing and a rotational biasing. Therefore, if no external force is applied, the locking member 101 is held in the first axial position. Moreover, because the first clamping block 113 and the second clamping block 114 respectively abut against the limiting protrusions 135, the locking member 101 will not rotate under action of the compression torsional spring 140.

When the user needs to switch the locking device 100 from the unlocked position to the locked position, starting from the state shown in FIGS. 7A to 7C, the user can press the knob 110 of the locking member 101. The locking member 101 will automatically rotate under action of the compression torsional spring 140, such that the locking device 100 reaches the state shown in FIGS. 8A to 8C. During this process, the locking member 101 first moves axially toward the second axial position by overcoming the axial biasing of the compression torsional spring 140 (i.e., moves towards the second object 400), does not rotate during this process, thus remains in the first rotational position and reaches the second axial position. When the locking member 101 is in the second axial position and the first rotational position, the bar head 123 protrudes from the fixing hole 410 of the second object 400, and the second clamping block 114 is no longer engaged to the limiting protrusion 135. Therefore, the locking member 101 is rotated toward the second rotational position under action of the compression torsional spring 140, remains in the second axial position and reaches the second rotational position. At this time, the bar head 123 is locked to the second object 400, and the second clamping block 114 rotates into the rotation space 136 below the limiting protrusion 135 (i.e., between the limiting protrusion 135 and the base portion 131). The second clamping block 114 abuts below the limiting protrusion 13, thus preventing the locking member 101 from returning to the first rotational position. At this time, the first clamping block 113 is still in the limiting space 137 because of having a large axial length. With rotation of the locking member 101, the first clamping block 113 rotates from one end to the other end of the limiting space 137, and rotates from abutting against one limiting protrusion 135 to abutting against the other limiting protrusion 135, and thus limits the locking member 101 from continuously rotating beyond the second rotational position.

Figure 8A:
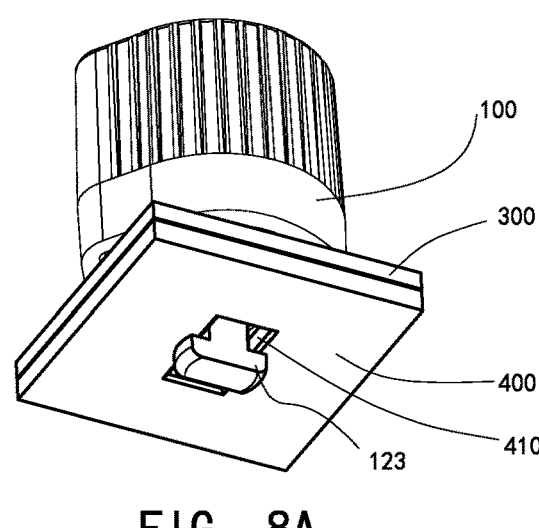
FIGS. 8A to 8C are schematic views of the locking device of the first embodiment applied to the first object and the second object with the locking member in a locked position (i.e., a second axial position and a second rotational position), and a portion of the knob has been removed in FIGS. 8B and 8C to show its internal components.
Figure 8B:
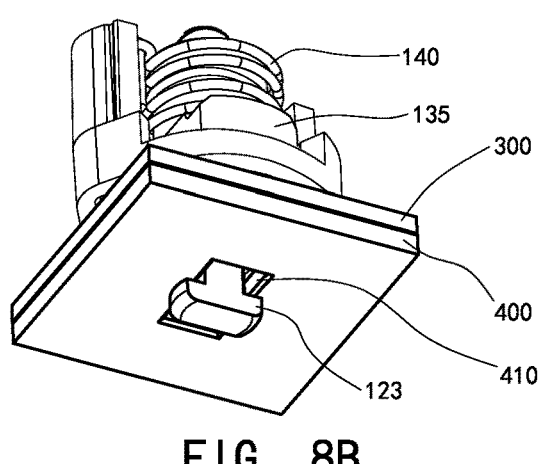
Figure 8C:
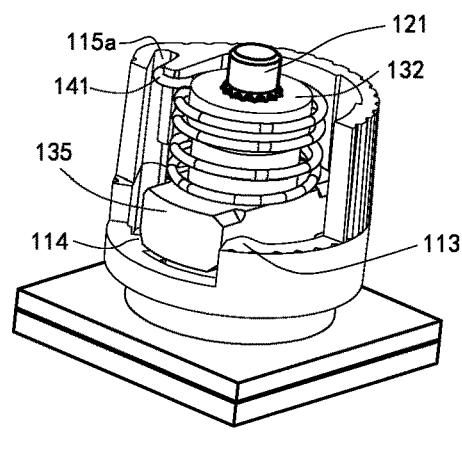
Figure 9D:
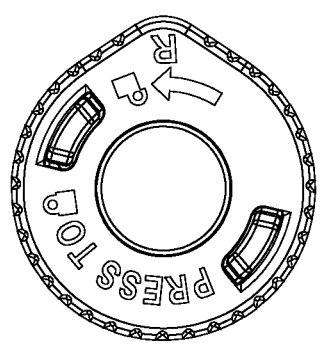
FIGS. 9A to 9E are respectively a front view, a left view, a right view, a top view, and a bottom view of the locking device in a unlocked position according to a second embodiment of the application.
Figure 9A:
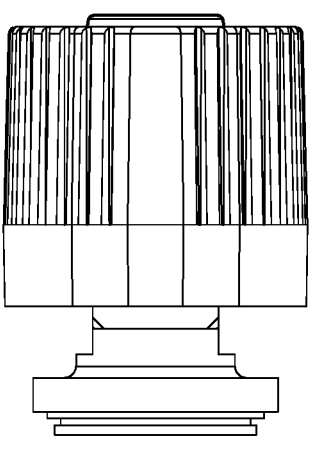
Figure 9B:
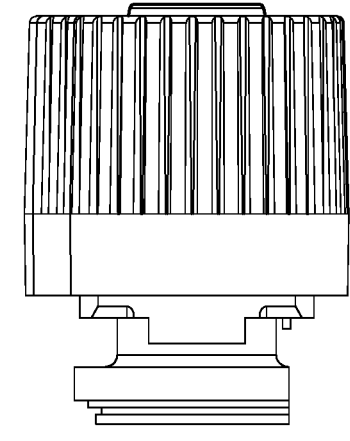
Figure 9E:
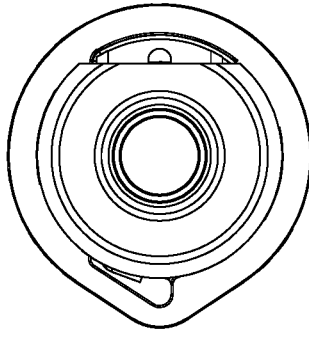
Figure 9C:
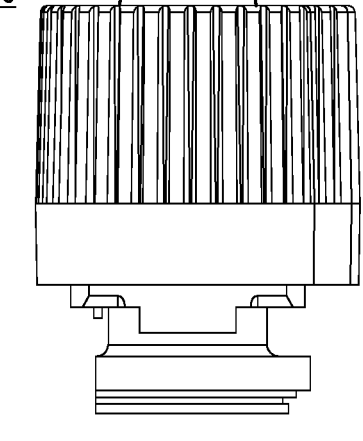
Figure 9F:
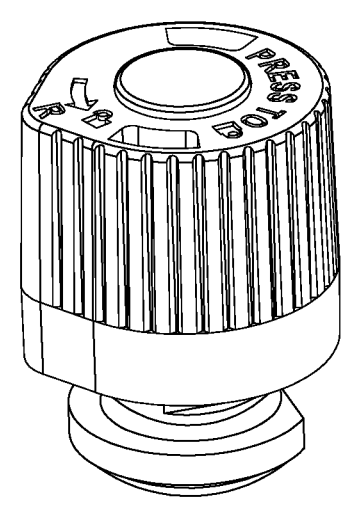
FIGS. 9F to 9G are perspective views of the locking device in the unlocked position of the second embodiment from different angles.
Figure 9G:
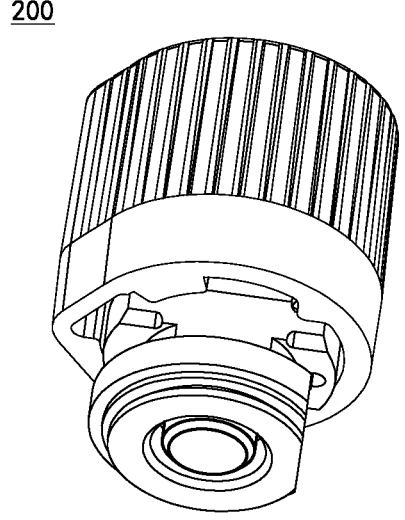
Figure 10D:
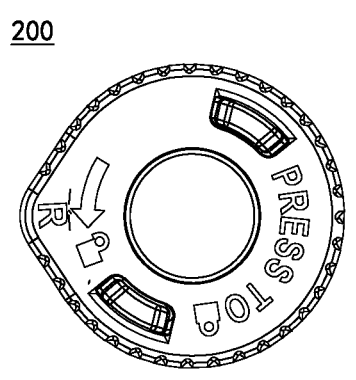
FIGS. 10A to 10E are respectively a front view, a left view, a right view, a top view, and a bottom view of the locking device in the locked position according to the second embodiment of the application.
Figure 10A:
Figure 10A:
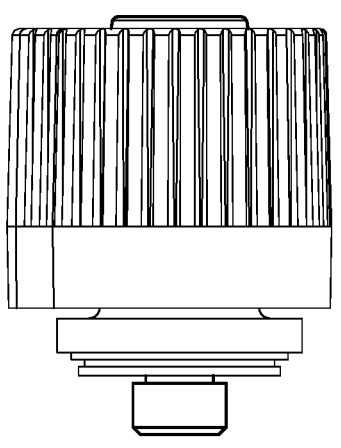
Figure 10B:
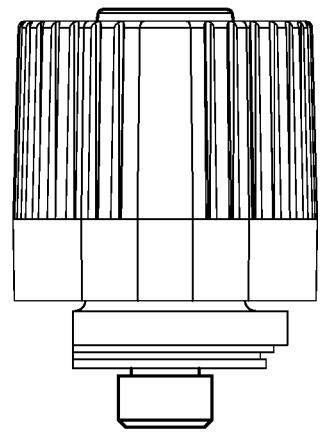
Figure 10E:
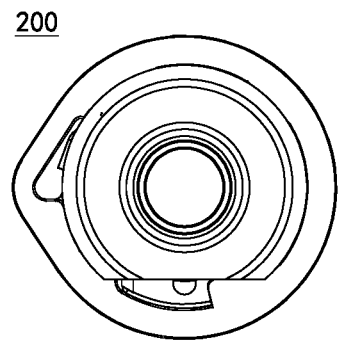
Figure 10C:
Figure 10C:
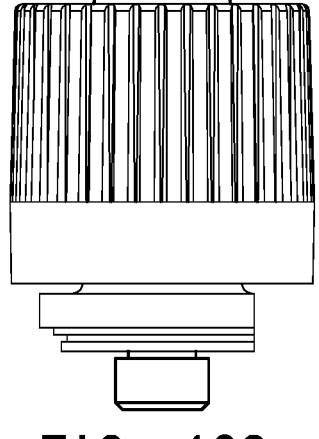
Figure 10F:
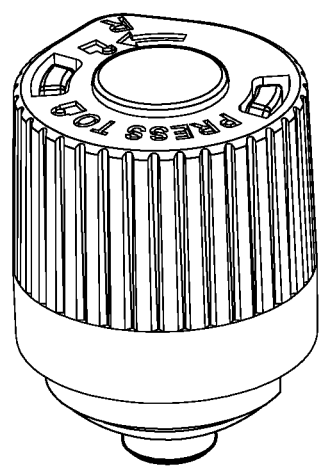
FIGS. 10F to 10G are perspective views of the locking device in the locked position of the second embodiment from different angles.
Figure 10G:
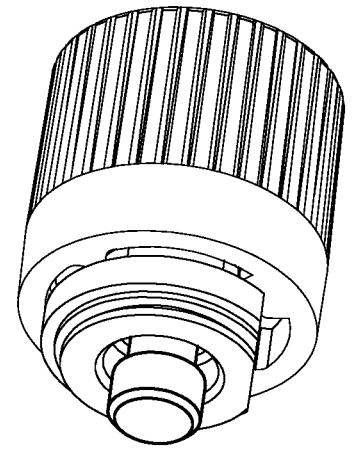
Figure 11:
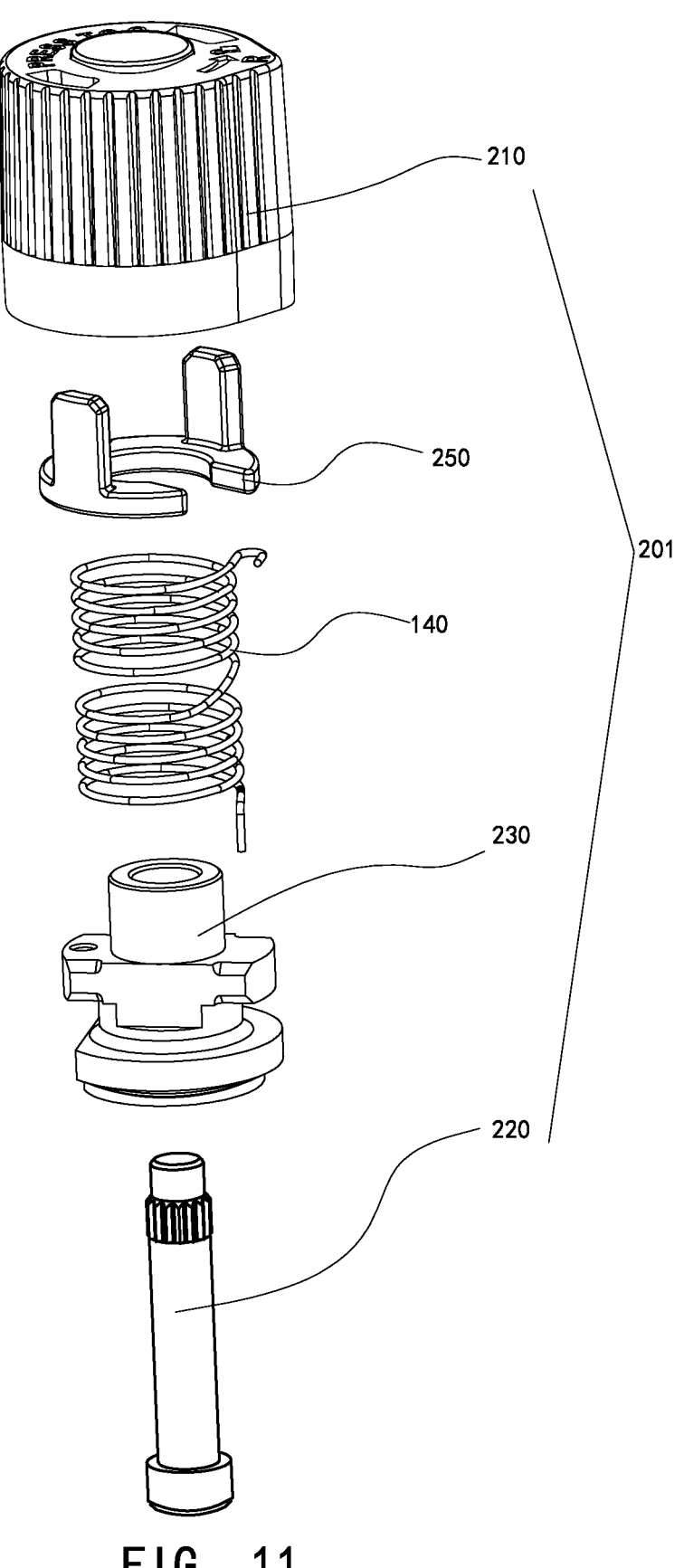
FIG. 11 is an exploded perspective view of the locking device of the second embodiment.

Conversely, when the user needs to switch the locking device 100 from the locked position to the unlocked position, starting from the state shown in FIGS. 8A to 8C, the user can rotate the knob 110 to the first rotational position. The locking member 101 will automatically move axially under action of the compression torsional spring 140, such that the locking device 100 reaches the state shown in FIGS. 7A to 7C. During this process, the locking member 101 first rotates toward the first rotational position by overcoming the rotational biasing of the compression torsional spring 140, does not move axially during this process, and therefore remains in the second axial position and rotates to the first rotational position. When the locking member 101 is in the first rotational position, direction of the bar head 123 is corresponding to the fixing hole 410 on the second object 400, and the second clamping block 114 leaves the rotation space 136 to enter the limiting space 137, such that the axial movement of the locking member 101 is no longer limited. Therefore, the locking member 101 is held in the first rotational position and moved towards the first axial position under the axial biasing of the compression torsional spring 140, finally returning to the unlocked position shown in FIGS. 7A to 7C.

A locking device 200 according to the second embodiment of the application will be generally described with reference to FIGS. 9A to 11. As shown, the locking device 200 includes a mounting seat 230, a locking member 201, and a compression torsional spring 240. The locking member 201 includes a knob 210 and a locking bar 220.

The difference between the locking device 200 of the second embodiment and the locking device 100 of the first embodiment lies in that an indicator 250 is added, which is disposed between the mounting seat 230 and the knob 210 for indicating the position of the locking device. Moreover, the form of the compression torsional spring 240 in the second embodiment is varied.

Figure 12A:
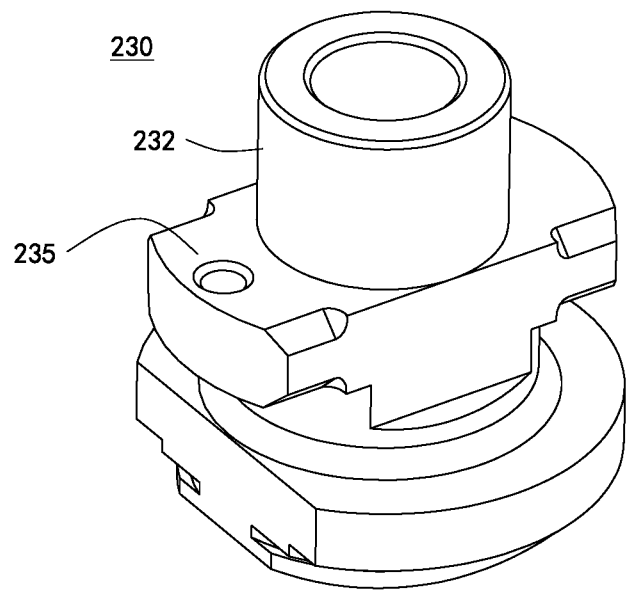
FIGS. 12A and 12B are perspective views of a mounting seat of the second embodiment from different angles.
Figure 12B:
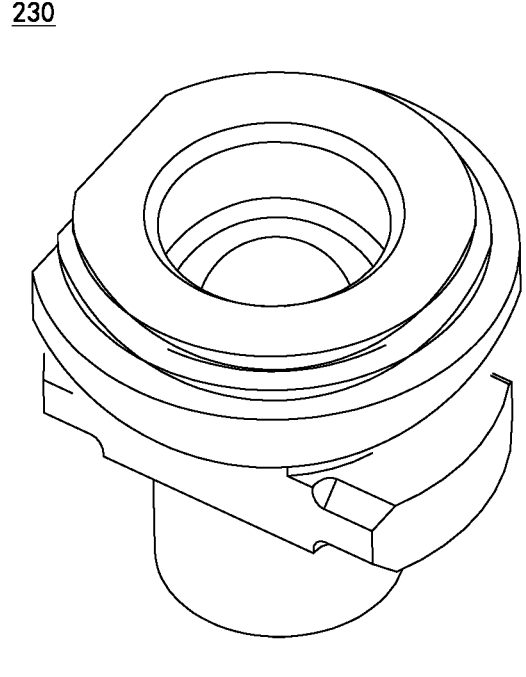

FIGS. 12A to 12B show the mounting seat 230 according to the second embodiment, which may have a structure as same as that of the mounting seat 130 according to the first embodiment.

Figure 13A:
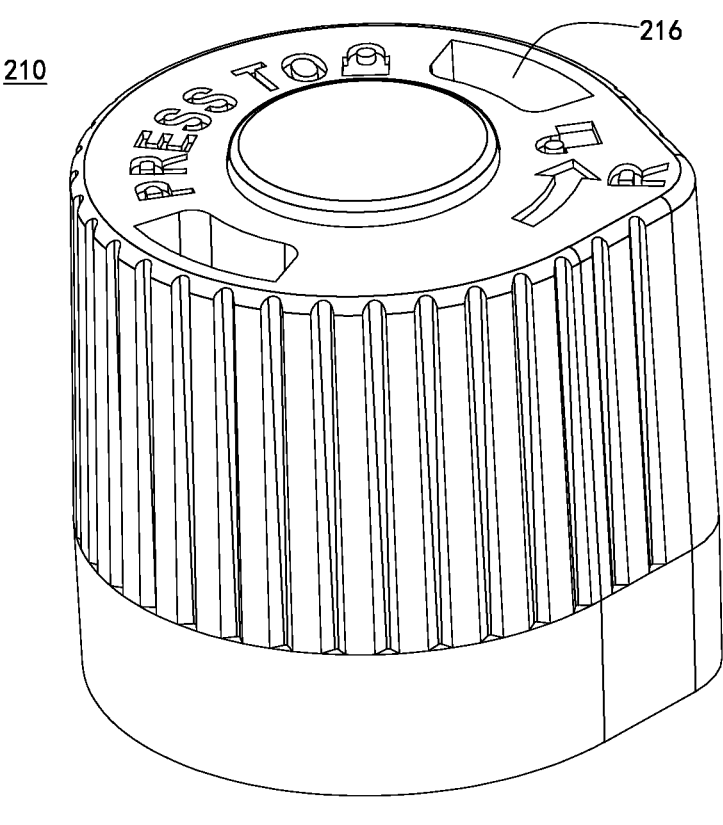
FIGS. 13A and 13B are perspective views of the knob of the second embodiment from different angles.
Figure 13B:
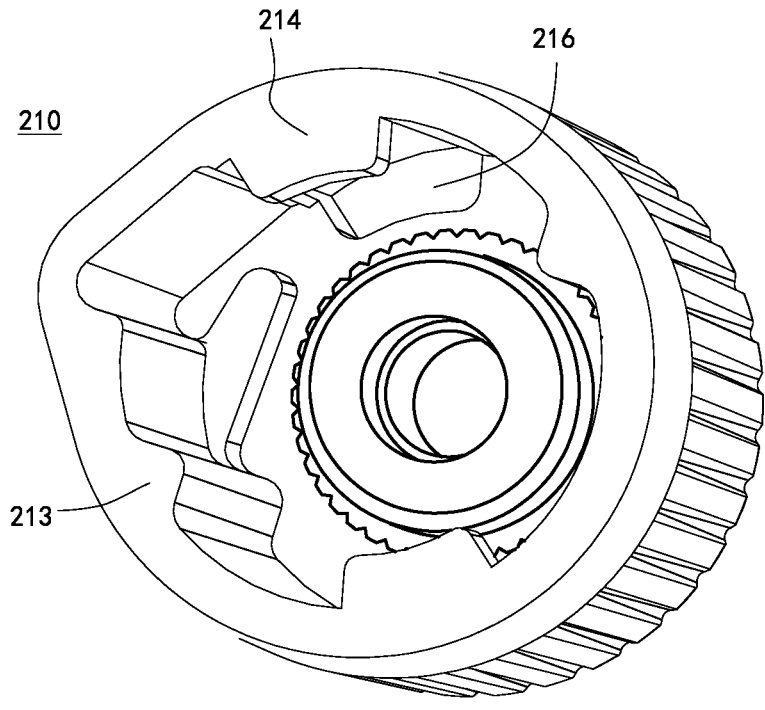

FIGS. 13A to 13B show the knob 210 according to the second embodiment, which may have a structure as same as that of the knob 110 according to the first embodiment.

Figure 14:
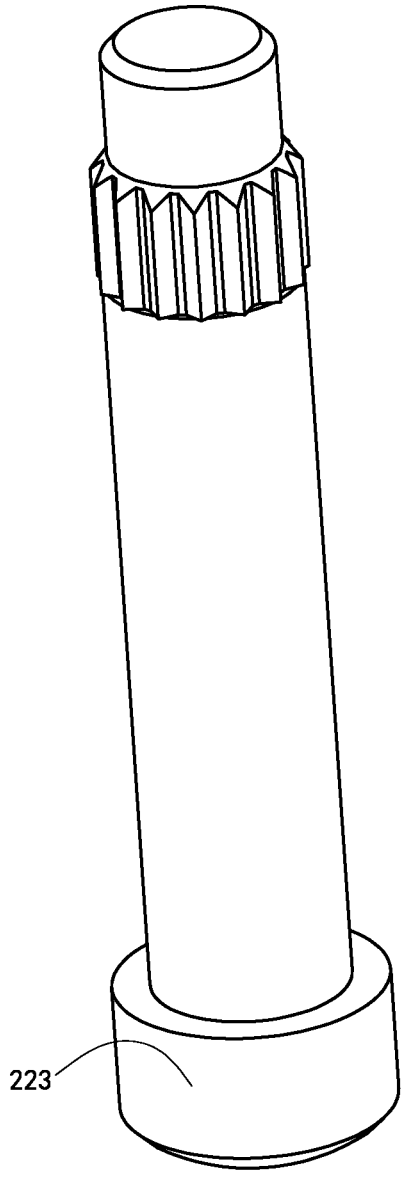
FIG. 14 is a perspective view of the locking bar of the second embodiment.

FIG. 14 shows the locking bar 220 according to the second embodiment. The bar head 223 of the locking bar 220 has a cylindrical shape. When the bar head 223 is integrated into the second object 400, it prevents a lateral relative movement between the first object 300 and the second object 400. It should be understood, the bar head 223 may also be formed in the form of the bar head 113 in the first embodiment.

Figure 15:
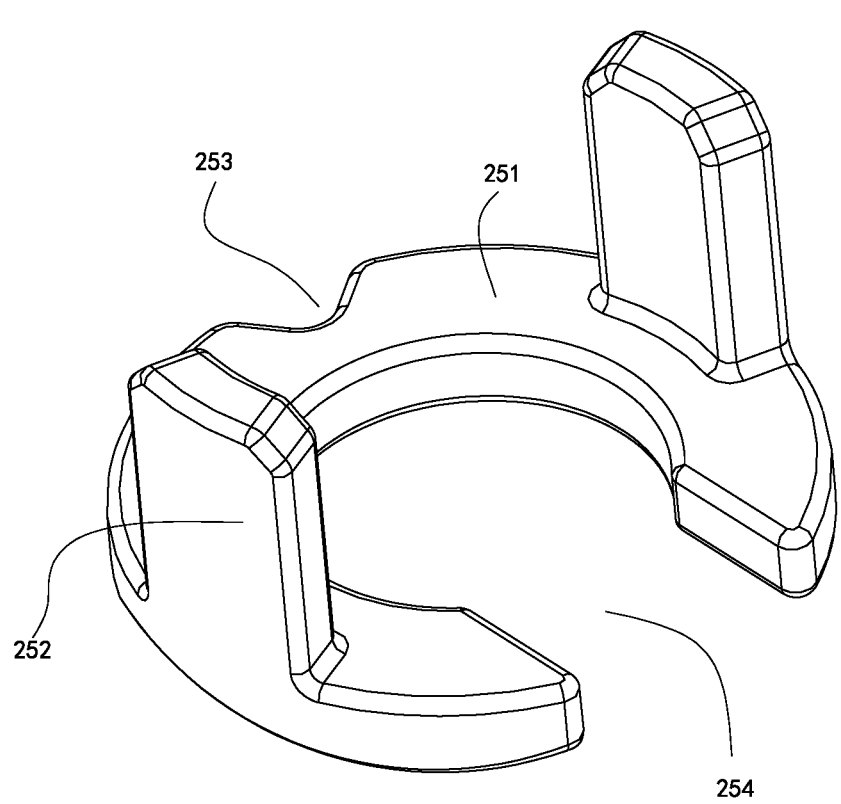
FIG. 15 is a perspective view of an indicator of the second embodiment.

The specific structure of the indicator 250 will be described with reference to FIG. 15.

The indicator 250 includes an annular portion 251 and at least one indicator portion 252 extending axially from a side of the annular portion 251. A recessed portion 253 recessed radially is formed on a peripheral edge of the annular portion 251, and an opening 254 radially passing through the annular portion 251 is formed on the other peripheral edge of the annular portion 251. In this embodiment, two indicating portions 252 are distributed on the annular portion 251 at uniform circumferential intervals, and the recessed portion 253 and the opening 254 are respectively formed between the two indicating portions 252 and are opposite to each other. However, it should be understood, in other embodiments, only one indication portion 252 or more than two indication portions 252 may be arranged, and circumferential positions of the one or more indicator portions 252, the recessed portion 253, and the opening 254 may vary according to actual conditions.

The specific structure of the compression torsional spring 240 will be described with reference to FIG. 16.

The compression torsional spring 240 includes a spring first end 241 and a spring second end 242, which are similar to the spring first end 141 and the spring second end 142 of the compression torsional spring 140 in the first embodiment. A first coil spring portion 243, a second coil spring portion 244, and a transition portion 245 connected between the first coil spring portion 243 and second coil spring portion 244 are formed between the spring first end 241 and the spring second end 242. the transition portion 245 has a larger pitch compared with the first coil spring portion 243 and the second coil spring portion 244, so as to pass through the opening 254 of the indicator 250.

The positional relationship and operation between the components of the locking device 200 in the locked position will be described with reference to FIGS. 17A to 18C.

The indicator 250 is rotatably sleeved on the column portion 232 of the mounting seat 230, and can move and rotate axially in respect to the column portion 232. The recessed portion 253 of the indicator 250 is engaged to the first clamping block 213 on the inner side of the knob 210 (FIG. 18B), so the indicator 250 is defined to rotate synchronously with the knob 210, but can move axially in respect to the knob 210. The first coil spring portion 243 of the compression torsional spring 240 is located between the indicator 250 and the knob 210, and the second coil spring portion 244 is located between the indicator 250 and the limiting protrusion 235 of the mounting seat 230. The first coil spring portion 243 and the second coil spring portion 244 may collectively provide a rotational biasing and an axial biasing to the knob 210, similar to the coil spring portion 143 in the first embodiment. When the locking member 201 moves between the locked position and the unlocked position, the indicator 250 is moved axially in respect to column portion 232 under action of the compression torsional spring 240. It should be understood, stroke of the axial movement of the indicator 250 is smaller than stroke of the locking member 201. Therefore, for example, in the process of moving from the locked position to the unlocked position, on the one hand the indicator 250 and the locking member 201 respectively move axially away from the column portion 232, and on the other hand the indicator 250 gradually moves away from the locking member 201 (particularly the observation window 216).

The indicator portion 252 of the indicator 250 is axially aligned with the observation window 216 of the knob. When the locking device 200 is in the locked position, that is, when the locking member 201 is in the second axial position, the indicator portion 252 is close to the observation window 216 or is inserted into the observation window 216, allowing the user to clearly observe the indicator portion 252, thereby easily knowing the locked state of the locking device 200.

In addition, it can also be more clearly observed from FIG. 18C, when the locking device 200 is in the locked position, the second clamping block 214 moves below the limiting protrusion 235, so its rotation is no longer limited by the limiting protrusion 235, while the first clamping block 213 is still limited from rotating by the limiting protrusion 235.

The positional relationship and operation between the components of the locking device 200 in the unlocked position will be described with reference to FIGS. 18A to 19C.

Compared with the locked position, the knob 210 rotates by a certain angle, e.g., 90 degrees, in respect to the mounting seat 230, and moves axially in respect to the mounting seat 230, such that the locking bar 220 is disengaged from the second object 400. As described previously, the indicator 250 rotates synchronously with the knob 210. The first coil spring portion 243 and the second coil spring portion 244 of the compression torsional spring 240 are arranged such that when the locking device 200 is in the unlocked position, that is, when the locking member 201 is in the first axial position, the indicator 250 is axially biased by the first coil spring portion 243 and the second coil spring portion 244, such that the indicator portion 252 exits the observation window 216 of the knob 210 axially. Therefore, the user cannot clearly observe the indicator portion 252, so the unlocking state of the locking device 200 can be easily known.

In different embodiments, the indicator 250 may be arranged to not move axially in respect to the mounting seat 230, for example, an engaging portion protruding radially may be disposed on the column portion 232 of the mounting seat 230 to limit the axial movement of the indicator 250.

In addition, it can be more clearly observed from FIG. 20C, when the locking device 200 is in the unlocked position, both the second clamping block 214 and the first clamping block 213 are limited from rotating by the limiting protrusion 235.

The case where the locking device 200 of the second embodiment is applied to the first object 300 and the second object 400 will be described with reference to FIGS. 21A to 22B. Since the bar head 223 is formed in a cylindrical shape, the fixing hole 410 of the second object 400 may be formed in a circular shape. In this way, the locking device 200 inly prevents the radial relative movement between the first object 300 and the second object 400, and allows the axial relative movement therebetween.

In conclusion, the application provides a quick-lock type locking device. By arranging a compression torsional spring, the locking member can automatically rotate during the locking process and automatically move axially during the unlocking process, thus assisting the locking member to complete the locking and unlocking actions, simplifying the user's operation.

The compression torsional spring of the application is sleeved on the outer side of the column portion of the mounting seat, thus allowing a compression torsional spring with a larger diameter to be provided, which is beneficial to provide appropriate axial biasing force and rotational biasing force.

The first clamping block, the second clamping block, and the limiting protrusion of the application have simple structures, which is beneficial for processing and can ensure accurate axial and rotational positioning of the locking member.

While preferred embodiments have been shown and described herein, it should be understood, these embodiments are given only as example. Many modifications, changes and substitutions will occur to those skilled in the art without departing from the spirit of the disclosure. Therefore, the appended claims are intended to cover all such modifications as fall within the spirit and scope of this disclosure.

LIST OF REFERENCE SIGNS

100 Locking Device
101 Locking Member
110 Knob
111 Knob First End
112 Knob Second End
113 First Clamping Block
114 Second Clamping Block
115 Sidewall Protrusion
115*a* Spring First End Fixing Portion
116 Observation Window
120 Locking Bar
121 Locking Bar First End
122 Locking Bar Second End
123 Bar Head
130 Mounting Seat
131 Base Portion
132 Column Portion
133 Shaft Hole
134 Reaming Hole
135 Limiting Protrusion
135*a* Side Face
135*c* Spring Second End Fixing Portion
136 Rotation Space
137 Limiting Space

14

140 Compression torsional Spring
141 Spring First End
142 Spring Second End
143 Coil Spring Portion
200 Locking Device
201 Locking Member
210 Knob
213 First Clamping Block
214 Second Clamping Block
216 Observation Window
220 Locking Bar
223 Bar Head
230 Mounting Seat
232 Column Portion
235 Limiting Protrusion
240 Compression Torsional Spring
241 Spring First End
242 Spring Second End
243 First Coil Spring Portion
244 Second Coil Spring Portion
245 Transition Portion
250 Indicator
251 Annular Portion
252 Indicator Portion
253 Recessed Portion
254 Opening
300 First Object
400 Second Object
410 Fixing Hole

What is claimed is:

1. A locking device, wherein the locking device comprises:

a mounting seat, fixed to a first object, the mounting seat including:

a base portion, fixed to the first object;

a column portion, extending from an end face of the base portion along an axial direction perpendicular to the end face;

a shaft hole, extending along the axial direction, located at a center of the column portion, and passing through the mounting seat; and at least one limiting protrusion, extending from an outer periphery of a middle section of the column portion along a transverse direction perpendicular to the axial direction, so as to form a rotation space among the column portion, the at least one limiting protrusion, and the base portion;

a locking member, rotatable around the axial direction and movable in the axial direction, and arranged on the mounting seat, when the locking member is in a first axial position and a first rotational position in respect to the mounting seat, the locking member is retracted into the mounting seat along the axial direction, and the mounting seat prevents the locking member from rotating around the axial direction, and when the locking member is in a second axial position and a second rotational position in respect to the mounting seat, at least a portion of the locking member extends in the axial direction from the mounting seat, to be inserted into and engaged with a second object, and the mounting seat prevents the locking member from moving in the axial direction, the locking member further comprising:

a knob, sleeved on an outer side of the mounting seat, having a knob first end and a knob second end opposite to each other along the axial direction, and the knob second end is open toward the mounting seat, a locking bar, inserted in the shaft hole of the mounting seat, having a locking bar first end and a locking bar second end opposite to each other along the axial direction, the locking bar first end is fixed to the knob, and the locking bar second end is able to be retracted into or extended out the mounting seat from the knob second end along the axial direction, the locking bar further includes a bar head formed at the locking bar second end and extending transversally, a fixing hole shaped corresponding to the bar head is formed on the second object, and wherein when the locking member is in the first rotational position, relative positions of the bar head and the fixing hole are corresponding to each other, so as to allow the locking member to pass through the fixing hole, and when the locking member is in the second rotational position, the relative positions of the bar head and the fixing hole are not corresponding to each other, so as to prevent the locking member from passing through the fixing hole, such that the bar head is able to be fixed to the second object; and a compression torsional spring, disposed between the mounting seat and the locking member, biasing the locking member toward the first axial position and the second rotational position;

wherein when the locking member is in the second axial position and the first rotational position, the compression torsional spring urges the locking member to rotate toward the second rotational position;

wherein an inner wall of the knob of the locking member is provided with at least one first clamping block protruding transversally inward and at least one second clamping block protruding transversally inward and spaced apart from the at least one first clamping block in a circumferential direction;

wherein the at least one first clamping block extends axially a first length from the knob second end toward the knob first end, and the at least one second clamping block extends axially a second length less than the first length from the knob second end toward the knob first end; and wherein positions and lengths of the at least one first clamping block and the at least one second clamping block in respect to the at least one limiting protrusion are arranged such that:

when the locking member is in the first axial position, both the at least first clamping block and the at least one second clamping block are obstructed by the at least one limiting protrusion in a circumferential direction around the axial direction, such that the locking member is unable to rotate, and when the locking member is in the second axial position, the at least one first clamping block is obstructed by the at least one limiting protrusion in one rotational direction along the circumferential direction, causing the locking member to be able to rotate in the other rotational direction along the circumferential direction, such that the at least one second clamping block is located in the rotation space and obstructed by the at least one limiting protrusion in the axial direction.

2. The locking device according to claim 1, wherein:

a reaming hole coaxial with the shaft hole is formed at another end face of the base portion of the mounting seat; and a transverse maximum dimension of the bar head is smaller than an inner diameter of the reaming hole, but larger than an inner diameter of the shaft hole, and when the locking member is in the first axial position, the bar head is retracted into and accommodated in the reaming hole.

3. The locking device according to claim 1, wherein:

the at least one limiting protrusion comprises two limiting protrusions arranged on opposing sides of the column portion that are transversally opposite to each other;

each of the two limiting protrusions is located in an approximately axial middle of the column portion; and each of the two limiting protrusions has two transversally opposite side faces, and the side faces of the two limiting protrusions on a same side are connected to each other, such that a limiting space is formed between the side faces of the two limiting protrusions on the same side and an inner surface of the knob, resulting in the limiting space and the rotation space are alternately arranged in the circumferential direction.

4. The locking device according to claim 3, wherein:

the at least one first clamping block comprises two first clamping blocks and the at least one second clamping block each comprises two second clamping blocks, the two first clamping blocks are arranged symmetrically in respect to the axial direction, and the two second clamping blocks are arranged symmetrically in respect to the axial direction and are respectively spaced apart from the two first clamping blocks by an angle in the circumferential direction; and when the locking member is in the first axial position, one of the two first clamping blocks and one of the two second clamping blocks are located in one of the limiting spaces; and when the locking member is in the second axial position, the one first clamping block is still located the one limiting space and the one second clamping block is able to be rotated from the one limiting space to the rotation space.

5. The locking device according to claim 4, wherein:

an axial cross-section of each of the first clamping blocks is approximately triangular, and an axial cross-section of each of the second clamping blocks is approximately trapezoidal and occupies a circumferentially larger area than the axial cross-section of each of the first clamping blocks.

6. The locking device according to claim 5, wherein:

the compression torsional spring includes:

a spring first end, engaged to the locking member;

a spring second end, engaged to the mounting seat; and a coil spring portion, connected between the spring first end and the spring second end and sleeved on the mounting seat;

a side wall of the knob has a sidewall protrusion transversally protruding outward, and the spring first end is inserted into a spring first end fixing portion at an inner side of the sidewall protrusion; and a spring second end fixing portion is disposed on one of the limiting protrusions, and the spring second end is inserted into the spring second end fixing portion.

7. The locking device according to claim 1, wherein the locking device further comprises:

an indicator, including:

an annular portion;

at least one indicator portion, extending axially from a side of the annular portion;

a recessed portion, formed on a peripheral edge of the annular portion and recessed radially;

the indicator is rotatably sleeved on the column portion of the mounting seat, and the recessed portion is engaged to the at least one first clamping block on the inner wall of the knob, such that the indicator rotates synchronously with the knob in respect to the mounting seat; and when the locking member is in the first axial position, the indicator portion is close to or inserted into an observation window at a top of the knob, and when the locking member is in the second axial position, the indicator portion is away from the observation window.

8. The locking device according to claim 7, wherein:

the indicator further includes: an opening, formed on the other peripheral edge of the annular portion and passing through the annular portion; and the compression torsional spring includes:

a spring first end, engaged to the locking member;

a spring second end, engaged to the mounting seat;

a first coil spring portion, located between the indicator and the knob;

a second coil spring portion, located between the indicator and the at least one limiting protrusion of the mounting seat and a transition portion, connected between the first coil spring portion and the second coil spring portion and passing through the opening.

9. The locking device according to claim 1, wherein:

the bar head formed at the locking bar second end has a cylindrical shape;

the fixing hole corresponding to the bar head formed on the second object is circular; and when the locking member is in the second axial position, the bar head is inserted into the fixing hole to prevent a radial relative movement between the first object and the second object.

* * * * *